US012809135B2

(12) United States Patent
Yu et al.

(10) Patent No.: US 12,809,135 B2
(45) Date of Patent: Nov. 24, 2026

(54) OPTICAL IMAGING LENS ASSEMBLY

(71) Applicant: ZHEJIANG SUNNY OPTICS CO., LTD., Ningbo (CN)

(72) Inventors: Qihang Yu, Ningbo (CN); Yuxiang Weng, Ningbo (CN); Wuchao Xu, Ningbo (CN); Zejie Yao, Ningbo (CN); Jianke Wenren, Ningbo (CN); Fujian Dai, Ningbo (CN)

(73) Assignee: ZHEJIANG SUNNY OPTICS CO., LTD., Ningbo (CN)

(*) Notice: Subject to any disclaimer, the term of this patent is extended or adjusted under 35 U.S.C. 154(b) by 78 days.

(21) Appl. No.: 18/963,237

(22) Filed: Nov. 27, 2024

(65) Prior Publication Data

US 2025/0251569 A1 Aug. 7, 2025

(30) Foreign Application Priority Data

Feb. 5, 2024 (CN) ........................ 202410167257.X

(51) Int. Cl.
*G02B 13/00* (2006.01)
*G02B 7/02* (2021.01)
(Continued)

(52) U.S. Cl.
CPC ......... *G02B 13/0045* (2013.01); *G02B 7/021* (2013.01); *G02B 7/025* (2013.01);
(Continued)

(58) Field of Classification Search
None
See application file for complete search history.

(56) References Cited

U.S. PATENT DOCUMENTS

2023/0244059 A1 8/2023 Jo
2023/0251473 A1* 8/2023 Huang ................ G02B 13/004 359/754
2023/0273408 A1 8/2023 Lee

FOREIGN PATENT DOCUMENTS

CN 113946029 A 1/2022
CN 116482831 A 7/2023
(Continued)

OTHER PUBLICATIONS

The search report of counterpart TW application No. 113146696 issued on Jul. 23, 2025.
(Continued)

*Primary Examiner* — Phu Vu
(74) *Attorney, Agent, or Firm* — The Sun IP Law

(57) ABSTRACT

Provided in the disclosure is an optical imaging lens assembly. The optical imaging lens assembly includes a first lens barrel, a second lens barrel, a first lens group, a second lens group, and a plurality of spacers; the first lens group includes a first lens, a second lens, and a third lens having a positive refractive power in sequence from an object side to an image side; the second lens group includes a fourth lens having a negative refractive power and a fifth lens; the plurality of spacers at least include a first spacer, a second spacer, and a fourth spacer, and an internal diameter of the fourth spacer is minimum; and when $-0.8<d4s/F2<0$ is met, $0.1<EPB4/LB-R7/R8<0.5$ is met. According to the disclosure, the problem in the related art of difficulties in stray light improvement in an optical imaging lens assembly is solved.

14 Claims, 13 Drawing Sheets

(51) Int. Cl.
*G02B 9/60* (2006.01)
*G02B 13/18* (2006.01)

(52) U.S. Cl.
CPC ............... *G02B 7/026* (2013.01); *G02B 9/60* (2013.01); *G02B 13/18* (2013.01)

(56) References Cited

FOREIGN PATENT DOCUMENTS

| | | | |
|---|---|---|---|
| CN | 117233963 | A | 12/2023 |
| TW | 202120993 | A | 6/2021 |
| TW | 202120995 | A | 6/2021 |
| TW | 202223473 | A | 6/2022 |
| TW | I809914 | B | 7/2023 |

OTHER PUBLICATIONS

The first Office Action of counterpart IN application No. 202414092372 issued on Aug. 21, 2026.

* cited by examiner

OPTICAL IMAGING LENS ASSEMBLY

CROSS-REFERENCE TO RELATED APPLICATION

This disclosure claims priority to Chinese Patent Application No. 202410167257.X filed to the China National Intellectual Property Administration on Feb. 5, 2024 and entitled "Optical Imaging Lens Assembly".

TECHNICAL FIELD

The disclosure relates to the technical field of optical imaging devices, and specifically, to an optical imaging lens assembly.

BACKGROUND OF THE INVENTION

With the growing consumer demand for cellphone photography, the optical imaging lens assembly of cellphones is required to be able to shoot farther and clearer. Meanwhile, considering the length and volume of the optical imaging lens assembly, a periscope telephoto lens needs to be designed to meet requirements. A periscope lens generally uses the combination of a plurality of lenses to compensate for each other's aberrations, so as to improve imaging quality, and by using an internal focusing grouping design, macro and infinity object photography are met. For the current optical imaging lens assembly, due to many internal devices, reflection of light among the devices easily produces stray light, affecting finally imaging quality. A light-shielding element is usually added to the lens to intercept the stray light, although this can intercept some stray light, the self stray light of the light-shielding element cannot be avoided, and the stray light is more difficult to improve.

That is to say, there is the problem in the related art of difficulties in stray light improvement in an optical imaging lens assembly.

SUMMARY OF THE INVENTION

Some embodiments of the disclosure are mainly intended to provide an optical imaging lens assembly, so as to solve the problem in the related art of difficulties in stray light improvement in an optical imaging lens assembly.

An embodiment of the disclosure provides an optical imaging lens assembly, including a first lens barrel, a second lens barrel, a first lens group, a second lens group, and a plurality of spacers; the first lens group is disposed in the first lens barrel, and the first lens group includes a first lens, a second lens, and a third lens having a positive refractive power in sequence from an object side to an image side; the second lens group is disposed in the second lens barrel, the second lens group includes a fourth lens having a negative refractive power and a fifth lens in sequence from an object side to an image side, an object-side surface of the fourth lens is a concave surface, and an image-side surface of the fourth lens is a convex surface; the plurality of spacers at least include a first spacer, a second spacer, and a fourth spacer, wherein an internal diameter of the fourth spacer is minimum, the first spacer is located on an image side of the first lens and partially abuts against an image-side surface of the first lens, the second spacer is located on an image side of the second lens and partially abuts against an image-side surface of the second lens, and the fourth spacer is located on an image side of the fourth lens and partially abuts against an image-side surface of the fourth lens; and when an internal diameter d4*s* of an object side of the fourth spacer and an effective focal length F2 of the second lens group meet $-0.8<d4s/F2<0$, an on-axis distance EPB4 between an object-side end surface of the second lens barrel and an object-side surface of the fourth spacer, a maximum axial height LB of the second lens barrel, a curvature radius R7 of the object-side surface of the fourth lens, and a curvature radius R8 of the image-side surface of the fourth lens meet $0.1<EPB4/LB-R7/R8<0.5$.

Another embodiment of the disclosure further provides an optical imaging lens assembly. The optical imaging lens assembly includes a first lens barrel, a second lens barrel, a first lens group, a second lens group, and a plurality of spacers; the first lens group is disposed in the first lens barrel, and the first lens group includes a first lens, a second lens, and a third lens having a positive refractive power in sequence from an object side to an image side; the second lens group is disposed in the second lens barrel, the second lens group includes a fourth lens having a negative refractive power and a fifth lens in sequence from an object side to an image side, an object-side surface of the fourth lens is a concave surface, and an image-side surface of the fourth lens is a convex surface; the plurality of spacers at least include a first spacer, a second spacer, and a fourth spacer, where an internal diameter of the fourth spacer is minimum, the first spacer is located on an image side of the first lens and partially abuts against an image-side surface of the first lens, the second spacer is located on an image side of the second lens and partially abuts against an image-side surface of the second lens, and the fourth spacer is located on an image side of the fourth lens and partially abuts against an image-side surface of the fourth lens; and when an internal diameter d4*s* of an object side of the fourth spacer and an effective focal length F2 of the second lens group meet $-0.8<d4s/F2<0$, a maximum axial height LA of the first lens barrel, the maximum axial height LB of the second lens barrel, an effective focal length F1 of the first lens group, and the effective focal length F2 of the second lens group meet $-0.2<(LA-LB)/(F1-F2)<0.3$.

Another embodiment of the disclosure further provides an optical imaging lens assembly. The optical imaging lens assembly includes a first lens barrel, a second lens barrel, a first lens group, a second lens group, and a plurality of spacers; the first lens group is disposed in the first lens barrel, and the first lens group includes a first lens, a second lens, and a third lens having a positive refractive power in sequence from an object side to an image side; the second lens group is disposed in the second lens barrel, the second lens group includes a fourth lens having a negative refractive power and a fifth lens in sequence from an object side to an image side, an object-side surface of the fourth lens is a concave surface, and an image-side surface of the fourth lens is a convex surface; the plurality of spacers at least include a first spacer, a second spacer, and a fourth spacer, wherein an internal diameter of the fourth spacer is minimum, the first spacer is located on an image side of the first lens and partially abuts against an image-side surface of the first lens, the second spacer is located on an image side of the second lens and partially abuts against an image-side surface of the second lens, and the fourth spacer is located on an image side of the fourth lens and partially abuts against an image-side surface of the fourth lens; and an effective focal length f5 of the fifth lens, an abbe number V5 of the fifth lens, and an external diameter D4*m* of an image side of the fourth spacer meet $-0.1<f5/V5/D4m<0.3$.

In an embodiment mode, an effective focal length f5 of the fifth lens, an abbe number V5 of the fifth lens, and an external diameter D4*m* of an image side of fourth spacer meet $-0.1<f5/V5/D4m<0.3$.

In an embodiment mode, a maximum axial height LA of the first lens barrel, the maximum axial height LB of the second lens barrel, an effective focal length F1 of the first lens group, and the effective focal length F2 of the second lens group meet $-0.2<(LA-LB)/(F1-F2)<0.3$.

In an embodiment mode, an internal diameter d1*m* of an image-side surface of the first spacer, an effective focal length f1 of the first lens, and an effective focal length f2 of the second lens meet $-2<d1m/f1-d1m/f2<2$.

In an embodiment mode, an internal diameter d2*m* of an image-side surface of the second spacer, an external diameter D2*m* of the image-side surface of the second spacer, a curvature radius R4 of the image-side surface of the second lens, and a curvature radius R5 of an object-side surface of the third lens meet $-4<(D2m-d2m)/(R4+R5)<0.5$.

In an embodiment mode, an effective focal length f4 of the fourth lens, the on-axis distance EPB4 between the object-side end surface of the second lens barrel and the object-side surface of the fourth spacer, and a refractive index N4 of the fourth lens meet $-20<f4/EPB4/N4<0$.

In an embodiment mode, the plurality of spacers further include a first auxiliary spacer, the first auxiliary spacer is located between the first spacer and the second lens, and an object-side surface of the first auxiliary spacer partially abuts against the first spacer; and an internal diameter D1*bm* of an image-side surface of the first auxiliary spacer, an internal diameter D1*bs* of the object-side surface of the first auxiliary spacer, a curvature radius R3 of an object-side surface of the second lens, and a curvature radius R2 of the image-side surface of the first lens meet $-3<D1bm/R3+D1bs/R2<5$.

In an embodiment mode, the plurality of spacers further include a first auxiliary spacer, a second auxiliary spacer, and a fourth auxiliary spacer, the first auxiliary spacer is located between the first spacer and the second lens, an object-side surface of the first auxiliary spacer partially abuts against the first spacer, the second auxiliary spacer is located between the second spacer and the third lens, an object-side surface of the second auxiliary spacer partially abuts against the second spacer, the fourth auxiliary spacer is located between the fourth spacer and the fifth lens, and an object-side surface of the fourth auxiliary spacer partially abuts against the fourth spacer; and a thickness CP1*b* of the first auxiliary spacer, a thickness CP2*b* of the second auxiliary spacer, a thickness CP4*b* of the fourth auxiliary spacer, an air gap T12 between the first lens and the second lens, an air gap T23 between the second lens and the third lens, and an air gap T45 between the fourth lens and the fifth lens meet $0.3<(CP1b+CP2b+CP4b)/(T12+T23+T45)<2$.

In an embodiment mode, the plurality of spacers further include a first auxiliary spacer, a second auxiliary spacer, and a fourth auxiliary spacer, the first auxiliary spacer is located between the first spacer and the second lens, an object-side surface of the first auxiliary spacer partially abuts against the first spacer, the second auxiliary spacer is located between the second spacer and the third lens, an object-side surface of the second auxiliary spacer partially abuts against the second spacer, the fourth auxiliary spacer is located between the fourth spacer and the fifth lens, and an object-side surface of the fourth auxiliary spacer partially abuts against the fourth spacer; a thickness CP1 of the first spacer and a thickness CP1*b* of the first auxiliary spacer meet $CP1b>CP1$; a thickness CP2 of the second spacer and a thickness CP2*b* of the second auxiliary spacer meet $CP2b>CP2$; and a thickness CP4 of the fourth spacer and a thickness CP4*b* of the fourth auxiliary spacer meet $CP4b>CP4$.

In an embodiment mode, a sum ΣCP of thicknesses of the plurality of spacers and an effective focal length f of the optical imaging lens assembly meet $4<f/\Sigma CP<12$.

In an embodiment mode, an internal diameter dAs of an object side of the first lens barrel, an internal diameter dBs of an object side of the second lens barrel, an effective focal length F1 of the first lens group, and an effective focal length F2 of the second lens group meet $1.5<dAs/F1-dBs/F2<2$.

In an embodiment mode, an effective focal length f3 of the third lens, an on-axis distance EP24 between the image-side surface of the second spacer and the object-side surface of the fourth spacer, and the on-axis distance EPB4 between the object-side end surface of the second lens barrel and the object-side surface of the fourth spacer meet $4<f3/(EP24-EPB4)<30$.

In an embodiment mode, an image-side surface of the fifth lens is bonded to an inner wall surface of the second lens barrel.

In an embodiment mode, an air gap between the third lens and the fourth lens may be adjusted, and the focusing of the optical imaging lens assembly is realized by adjusting the air gap between the third lens and the fourth lens.

By using the technical solutions of the disclosure, the optical imaging lens assembly includes the first lens barrel, the second lens barrel, the first lens group, the second lens group, and the plurality of spacers; the first lens group is disposed in the first lens barrel, and the first lens group includes the first lens, the second lens, and the third lens having the positive refractive power in sequence from the object side to the image side; the second lens group is disposed in the second lens barrel, the second lens group includes the fourth lens having the negative refractive power and the fifth lens in sequence from the object side to the image side, the object-side surface of the fourth lens is the concave surface, and the image-side surface of the fourth lens is the convex surface; the plurality of spacers at least include the first spacer, the second spacer, and the fourth spacer, wherein the internal diameter of the fourth spacer is minimum, the first spacer is located on the image side of the first lens and partially abuts against the image-side surface of the first lens, the second spacer is located on the image side of the second lens and partially abuts against the image-side surface of the second lens, and the fourth spacer is located on the image side of the fourth lens and partially abuts against the image-side surface of the fourth lens; and when the internal diameter d4*s* of the object side of the fourth spacer and the effective focal length F2 of the second lens group meet $-0.8<d4s/F2<0$, the on-axis distance EPB4 between the object-side end surface of the second lens barrel and the object-side surface of the fourth spacer, the maximum axial height LB of the second lens barrel, the curvature radius R7 of the object-side surface of the fourth lens, and the curvature radius R8 of the image-side surface of the fourth lens meet $0.1<EPB4/LB-R7/R8<0.5$.

The optical imaging lens assembly of the disclosure consists of the first lens barrel, the first lens group disposed in the first lens barrel, the second lens barrel, the second lens group disposed in the second lens barrel, and the plurality of spacers; and the first lens group consists of three lenses, and the second lens group consists of two lenses. When the internal diameter d4*s* of the object side of the fourth spacer and the effective focal length F2 of the second lens group are restrained to meet $-0.8<d4s/F2<0$, the internal diameter of the object side of the fourth spacer is relatively small, resulting in tail end stray light, and thus not facilitating stray light improvement of the optical imaging lens assembly. Therefore, in the disclosure, through constraint of 0.1<EPB4/LB−R7/R8<0.5, stray light phenomena may be effectively improved, and some stray light is avoided through dimensional compression and a light-shielding effect of the spacer. Limitations to the maximum axial height of the second lens barrel may avoid tail end stray light. The energy of such stray light is relatively strong, which is difficult to improve. By controlling the curvature radius of the fourth lens and the effective focal length of the second lens group, a degree of dispersion of light refraction may be improved, facilitating improvement and avoiding of complex stray light generated through internal reflection of the optical imaging lens assembly. The size of the internal diameter of the spacer facilitates the shielding of the generated stray light. Limitations to the EPB4 causes a structure space to be more compact so as to further avoid the generation of the stray light, thereby ensuring that the spacer may effectively play a role in shielding light.

BRIEF DESCRIPTION OF THE DRAWINGS

The drawings, which form a part of the disclosure, are used to provide a further understanding of the disclosure. The exemplary embodiments of the disclosure and the description thereof are used to explain the disclosure, but do not constitute improper limitations to the disclosure. In the drawings.

Figure 1:
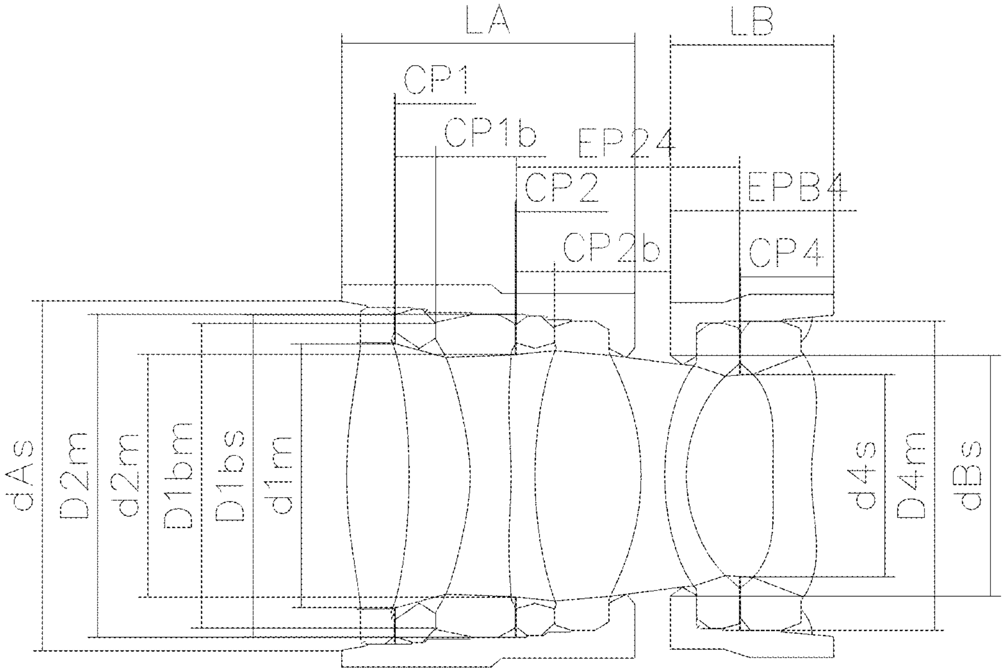
FIG. 1 is a dimensioning diagram of an optical imaging lens assembly according to an embodiment of the disclosure.

The above drawings include the following reference numerals:

E1, First lens; S1, Object-side surface of first lens; S2, Image-side surface of first lens; E2, Second lens; S3, Object-side surface of second lens; S4, Image-side surface of second lens; E3, Third lens; S5, Object-side surface of third lens; S6, Image-side surface of third lens; E4, Fourth lens; S7, Object-side surface of fourth lens; S8, Image-side surface of fourth lens; E5, Fifth lens; S9, Object-side surface of fifth lens; S10, Image-side surface of fifth lens; PA, First lens barrel; PB, Second lens barrel; P1, First spacer; P1*b*, First auxiliary spacer; P2, Second spacer; P2*b*, Second auxiliary spacer; P4, Fourth spacer; and P4*b*, Fourth auxiliary spacer.

DETAILED DESCRIPTION OF THE INVENTION

It should be noted that examples of the disclosure and features in the examples may be combined with one another if there is no conflict. The disclosure will be described in detail below with reference to accompanying drawings and in combination with examples.

It is to be noted that the embodiments in the disclosure and the features in the embodiments may be combined with one another without conflict. The disclosure will be described below in detail with reference to the drawings and the embodiments.

It is to be noted that, unless otherwise defined, all technical and scientific terms used herein have the same meaning as commonly understood by those of ordinary skill in the art to which the disclosure belongs.

In the disclosure, in the absence of any indication to the contrary, terms such as "on, under, top, and bottom" are used generally with respect to the orientation shown in the drawings, or with respect to the parts themselves in the vertical, perpendicular, or gravitational direction; and similarly, for ease of comprehension and description, "inside or outside" refers to the inside and the outside of the contours of the respective parts themselves, provided, however, that the above terms are not intended to be used in a manner that restricts the disclosure.

It is to be noted that, in the specification, expressions such as first, second, third, etc. are used only to distinguish one feature from another and do not indicate any limitation of the features. Accordingly, without departing from the teachings of the disclosure, the first lens discussed below may also be referred to as a second lens or a third lens.

In the drawings, the thickness, size and shape of the lens have been slightly exaggerated for ease of illustration. Specifically, a spherical shape or aspheric shape shown in the drawings is shown by some embodiments. That is, the spherical shape or the aspheric shape is not limited to the spherical shape or aspheric shape shown in the drawings. The drawings are for illustrative purposes only and are not strictly to scale.

Herein, a paraxial region refers to a region nearby an optical axis. If the surface of a lens is convex and a position of the convex surface is not defined, it indicates that the lens surface is a convex surface at least in the paraxial region; and if the surface of the lens is a concave surface and a position of the concave surface is not defined, it indicates that the lens surface is a concave surface at least in the paraxial region. Determination of the shape of the surface in the paraxial region may be based on the determination of those who are generally knowledgeable in the art, a convex surface and a concave surface are determined by a positive R-value or a negative R-value (R refers to a curvature radius of the paraxial region, and generally refers to an R value on a lens data base in optical software). For a light entry side surface, when the R value is positive, it is determined as a convex surface; and when the R value is negative, it is determined as a concave surface; and for a light exit side surface, when the R value is positive, it is determined as a concave surface; and when the R value is negative, it is determined as a convex surface.

In order to solve the problem in the related art of difficulties in stray light improvement in an optical imaging lens assembly, the disclosure provides an optical imaging lens assembly.

As shown in FIG. 1 to FIG. 27, in an optional implementation of the disclosure, the optical imaging lens assembly includes the first lens barrel, the second lens barrel, the first lens group, the second lens group, and the plurality of spacers; the first lens group is disposed in the first lens barrel, and the first lens group includes the first lens, the second lens, and the third lens having the positive refractive power in sequence from the object side to the image side; the second lens group is disposed in the second lens barrel, the second lens group includes the fourth lens having the negative refractive power and the fifth lens in sequence from the object side to the image side, the object-side surface of the fourth lens is the concave surface, and the image-side surface of the fourth lens is the convex surface;

the plurality of spacers at least include the first spacer, the second spacer, and the fourth spacer, wherein the internal diameter of the fourth spacer is minimum, the first spacer is located on the image side of the first lens and partially abuts against the image-side surface of the first lens, the second spacer is located on the image side of the second lens and partially abuts against the image-side surface of the second lens, and the fourth spacer is located on the image side of the fourth lens and partially abuts against the image-side surface of the fourth lens; and when the internal diameter $d4s$ of the object side of the fourth spacer and the effective focal length $F2$ of the second lens group meet $-0.8<d4s/F2<0$, the on-axis distance EPB4 between the object-side end surface of the second lens barrel and the object-side surface of the fourth spacer, the maximum axial height LB of the second lens barrel, the curvature radius R7 of the object-side surface of the fourth lens, and the curvature radius R8 of the image-side surface of the fourth lens meet $0.1<EPB4/LB-R7/R8<0.5$.

The optical imaging lens assembly of the disclosure consists of the first lens barrel, the first lens group disposed in the first lens barrel, the second lens barrel, the second lens group disposed in the second lens barrel, and the plurality of spacers; and the first lens group consists of three lenses, and the second lens group consists of two lenses. When the internal diameter $d4s$ of the object side of the fourth spacer and the effective focal length $F2$ of the second lens group are restrained to meet $-0.8<d4s/F2<0$, the internal diameter of the object side of the fourth spacer is relatively small, resulting in tail end stray light, and thus not facilitating stray light improvement of the optical imaging lens assembly. Therefore, in the disclosure, through constraint of $0.1<EPB4/LB-R7/R8<0.5$, stray light phenomena may be effectively improved, and some stray light is avoided through dimensional compression and a light-shielding effect of the spacer. Limitations to the maximum axial height of the second lens barrel may avoid tail end stray light. The energy of such stray light is relatively strong, which is difficult to improve. By controlling the curvature radius of the fourth lens and the effective focal length of the second lens group, a degree of dispersion of light refraction may be improved, facilitating improvement and avoiding of complex stray light generated through internal reflection of the optical imaging lens assembly. The size of the internal diameter of the spacer facilitates the shielding of the generated stray light. Limitations to the EPB4 causes a structure space to be more compact so as to further avoid the generation of the stray light, thereby ensuring that the spacer may effectively play a role in shielding light.

Figure 24:
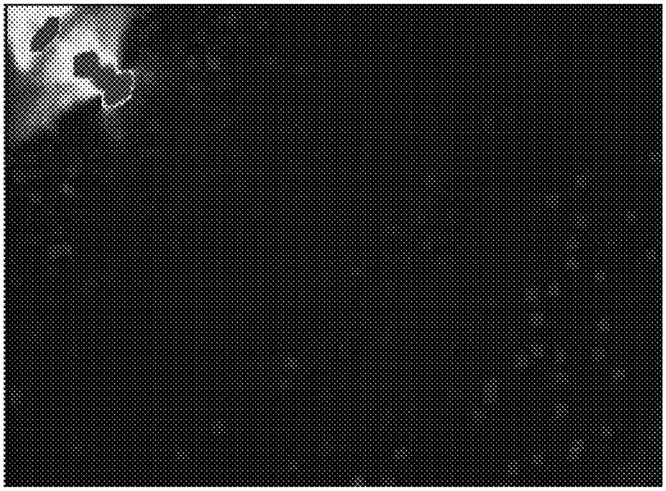
FIG. 24 is a stray light diagram when an optical imaging lens assembly meets d4*s*/F2=−0.51 and EPB4/LB−R7/R8=0.11 according to an embodiment of the disclosure.
Figure 25:
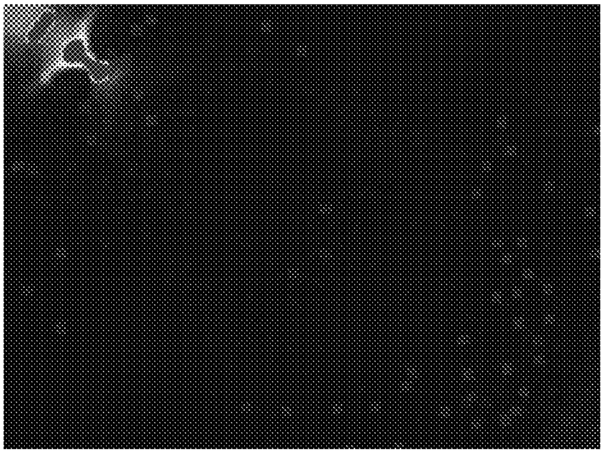
FIG. 25 is a stray light diagram when an optical imaging lens assembly meets d4*s*/F2=−0.51 and EPB4/LB−R7/R8=0.14 according to an embodiment of the disclosure.
Figure 26:
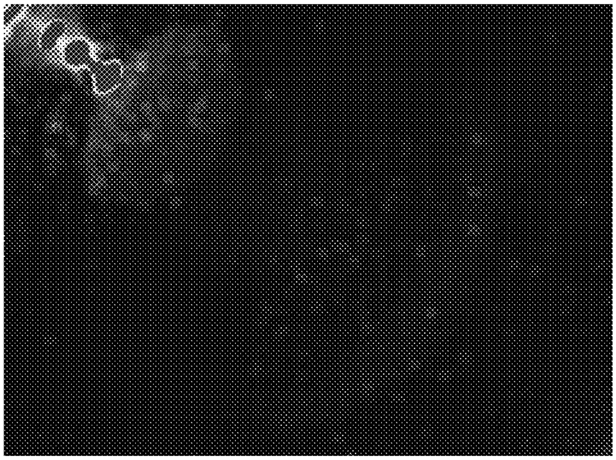
FIG. 26 is a stray light diagram when an optical imaging lens assembly meets d4*s*/F2=−0.51 and EPB4/LB−R7/R8=−1 according to an embodiment of the disclosure.
Figure 27:
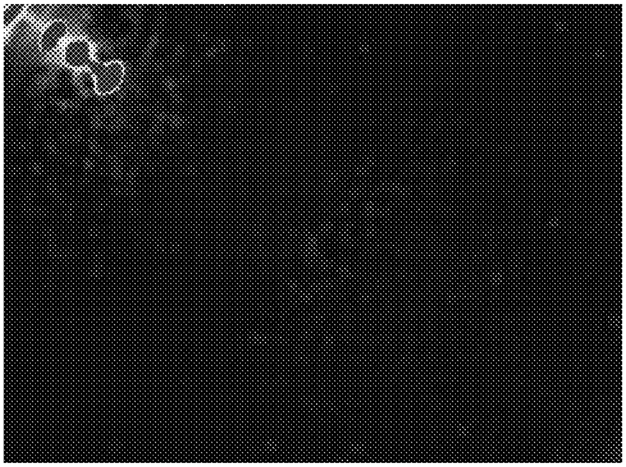
FIG. 27 is a stray light diagram when an optical imaging lens assembly meets d4*s*/F2=−0.51 and EPB4/LB−R7/R8=1 according to an embodiment of the disclosure.

Furthermore, in so far as the optical imaging lens assembly meets $d4s/F2=-0.51$, FIG. 24 shows a stray light diagram of the optical imaging lens assembly when $EPB4/LB-R7/R8=0.11$; FIG. 25 shows a stray light diagram of the optical imaging lens assembly when $EPB4/LB-R7/R8=0.14$; FIG. 26 shows a stray light diagram of the optical imaging lens assembly when $EPB4/LB-R7/R8=-1$; and FIG. 27 shows a stray light diagram of the optical imaging lens assembly when $EPB4/LB-R7/R8=1$. From FIG. 24 to FIG. 27, it may be learned that, stray light improvement is worse when $EPB4/LB-R7/R8=-1$ and $EPB4/LB-R7/R8=1$; and stray light improvement is better when $EPB4/LB-R7/R8=0.11$ and $EPB4/LB-R7/R8=0.14$. It may be seen that, when $EPB4/LB-R7/R8$ is in a range from 0.1 to 0.5, stray light improvement of the optical imaging lens assembly is better. Therefore, in the disclosure, by restraining $0.1<EPB4/LB-R7/R8<0.5$, the generation of stray light can be avoided while a structure space is more compact, so as to ensure the imaging quality of the optical imaging lens assembly.

In this implementation, an effective focal length $f5$ of the fifth lens, an abbe number $V5$ of the fifth lens, and an external diameter $D4m$ of an image side of fourth spacer meet $-0.1<f5/V5/D4m<0.3$. By controlling the above parameters, the chromatic aberration of an optical system may be effectively optimized, such that purple fringes during imaging is significantly improved.

In this implementation, a maximum axial height LA of the first lens barrel, the maximum axial height LB of the second lens barrel, an effective focal length $F1$ of the first lens group, and the effective focal length $F2$ of the second lens group meet $-0.2<(LA-LB)/(F1-F2)<0.3$. By controlling the above parameters, a spatial volume size of the optical imaging lens assembly and a degree of dispersion of light may be limited, and the generation of complex stray light is effectively avoided.

In this implementation, an internal diameter d1*m* of an image-side surface of the first spacer, an effective focal length f1 of the first lens, and an effective focal length f2 of the second lens meet $-2<d1m/f1-d1m/f2<2$. By controlling the above parameters, the dispersion of the light may be effectively limited, such that the generation of some stray light is avoided, and the stray light generated by mechanisms is shielded through the spacer.

In this implementation, an internal diameter d2*m* of an image-side surface of the second spacer, an external diameter D2*m* of the image-side surface of the second spacer, a curvature radius R4 of the image-side surface of the second lens, and a curvature radius R5 of an object-side surface of the third lens meet $-4<(D2m-d2m)/(R4+R5)<0.5$. By controlling the above parameters, when enough assembly support lengths are provided, the generation of the complex stray light may be effectively avoided, thereby improving imaging quality.

In this implementation, an effective focal length f4 of the fourth lens, the on-axis distance EPB4 between the object-side end surface of the second lens barrel and the object-side surface of the fourth spacer, and a refractive index N4 of the fourth lens meet $-20<f4/EPB4/N4<0$. By controlling the above parameters, chromatic aberration and the length of the optical imaging lens assembly may be effectively limited, so as to improve the purple fringes.

In this implementation, the plurality of spacers further include a first auxiliary spacer, the first auxiliary spacer is located between the first spacer and the second lens, and an object-side surface of the first auxiliary spacer partially abuts against the first spacer; and an internal diameter D1*bm* of an image-side surface of the first auxiliary spacer, an internal diameter D1*bs* of the object-side surface of the first auxiliary spacer, a curvature radius R3 of an object-side surface of the second lens, and a curvature radius R2 of the image-side surface of the first lens meet $-3<D1bm/R3+D1bs/R2<5$. By controlling the above parameters, when enough assembly support lengths are provided, the generation of the complex stray light may be are effectively avoided by means of a shielding function of the spacer, thereby improving imaging quality.

In this implementation, the plurality of spacers further include a second auxiliary spacer and a fourth auxiliary spacer, the second auxiliary spacer is located between the second spacer and the third lens, an object-side surface of the second auxiliary spacer partially abuts against the second spacer, the fourth auxiliary spacer is located between the fourth spacer and the fifth lens, and an object-side surface of the fourth auxiliary spacer partially abuts against the fourth spacer; and a thickness CP1*b* of the first auxiliary spacer, a thickness CP2*b* of the second auxiliary spacer, a thickness CP4*b* of the fourth auxiliary spacer, an air gap T12 between the first lens and the second lens, an air gap T23 between the second lens and the third lens, and an air gap T45 between the fourth lens and the fifth lens meet $0.3<(CP1b+CP2b+CP4b)/(T12+T23+T45)<2$. By controlling the above parameters, the total length of the optical imaging lens assembly may be effectively limited when assembly stability is guaranteed, such that the impact on performance vulnerable to the air gaps caused by too large air gaps is avoided.

In this implementation, the thickness CP1 of the first spacer and the thickness CP1*b* of the first auxiliary spacer meet $CP1b>CP1$; the thickness CP2 of the second spacer and the thickness CP2*b* of the second auxiliary spacer meet $CP2b>CP2$; and the thickness CP4 of the fourth spacer and the thickness CP4*b* of the fourth auxiliary spacer meet $CP4b>CP4$. By controlling the above relationship, limitations to the thicknesses facilitate the improvement of the assembly stability of the optical imaging lens assembly, so as to improve the machinability of the spacer, thereby obtaining better part quality.

In this implementation, a sum ΣCP of thicknesses of the plurality of spacers and an effective focal length f of the optical imaging lens assembly meet $4<f/\Sigma CP<12$. By controlling the above parameters, the total optical length and back focal length of the optical imaging lens assembly may be effectively limited, thereby ensuring miniaturization while the back focal length is compressed.

In this implementation, an internal diameter dAs of an object side of the first lens barrel, an internal diameter dBs of an object side of the second lens barrel, an effective focal length F1 of the first lens group, and an effective focal length F2 of the second lens group meet $1.5<dAs/F1-dBs/F2<2$. By controlling the above parameters, a distance between an imaging surface and a tail end of the optical imaging lens assembly may be effectively limited, causing the overall size and back focal length of the optical imaging lens assembly to be relatively small.

In this implementation, an effective focal length f3 of the third lens, an on-axis distance EP24 between the image-side surface of the second spacer and the object-side surface of the fourth spacer, and the on-axis distance EPB4 between the object-side end surface of the second lens barrel and the object-side surface of the fourth spacer meet $4<f3/(EP24-EPB4)<30$. By controlling the above parameters, the length of travel from a finite distance to an infinite distance during internal focusing can be limited.

In this implementation, an image-side surface of the fifth lens is bonded to an inner wall surface of the second lens barrel. A fixed connection between the image-side surface of the fifth lens and the second lens barrel is achieved through glue dispensing, such that the reliability of the optical imaging lens assembly is improved, thereby ensuring that structure stability and overall performance are not affected under a dropping condition.

In this implementation, an air gap between the third lens and the fourth lens may be adjusted, and the focusing of the optical imaging lens assembly is realized by adjusting the air gap between the third lens and the fourth lens. By changing the air gap between the third lens and the fourth lens, a telephoto lens may achieve macro and infinity clear imaging of objects.

As shown in FIG. 1 to FIG. 27, in another optional implementation of the disclosure, the disclosure further provides an optical imaging lens assembly. The optical imaging lens assembly includes a first lens barrel, a second lens barrel, a first lens group, a second lens group, and a plurality of spacers; the first lens group is disposed in the first lens barrel, and the first lens group includes a first lens, a second lens, and a third lens having a positive refractive power in sequence from an object side to an image side; the second lens group is disposed in the second lens barrel, the second lens group includes a fourth lens having a negative refractive power and a fifth lens in sequence from an object side to an image side, an object-side surface of the fourth lens is a concave surface, and an image-side surface of the fourth lens is a convex surface; the plurality of spacers at least include a first spacer, a second spacer, and a fourth spacer, where an internal diameter of the fourth spacer is minimum, the first spacer is located on an image side of the first lens and partially abuts against an image-side surface of the first lens, the second spacer is located on an image side of the second lens and partially abuts against an image-side surface of the second lens, and the fourth spacer is located on an image side of the fourth lens and partially abuts against an image-side surface of the fourth lens; and when an internal diameter d4s of an object side of the fourth spacer and an effective focal length F2 of the second lens group meet $-0.8<d4s/F2<0$, a maximum axial height LA of the first lens barrel, the maximum axial height LB of the second lens barrel, an effective focal length F1 of the first lens group, and the effective focal length F2 of the second lens group meet $-0.2<(LA-LB)/(F1-F2)<0.3$.

The optical imaging lens assembly of the disclosure consists of the first lens barrel, the first lens group disposed in the first lens barrel, the second lens barrel, the second lens group disposed in the second lens barrel, and the plurality of spacers; and the first lens group consists of three lenses, and the second lens group consists of two lenses. When the internal diameter d4s of the object side of the fourth spacer and the effective focal length F2 of the second lens group are restrained to meet $-0.8<d4s/F2<0$, the internal diameter of the object side of the fourth spacer is relatively small, resulting in tail end stray light, and thus not facilitating stray light improvement of the optical imaging lens assembly. Therefore, in the disclosure, by restraining $-0.2<(LA-LB)/(F1-F2)<0.3$, a spatial volume size of the optical imaging lens assembly and a degree of dispersion of light may be limited, and the generation of complex stray light is effectively avoided.

Definitely, in this implementation, other parametric formulas in the above implementations may also be included, and are not described herein again.

As shown in FIG. 1 to FIG. 27, in another optional implementation of the disclosure, the disclosure further provides an optical imaging lens assembly. The optical imaging lens assembly includes a first lens barrel, a second lens barrel, a first lens group, a second lens group, and a plurality of spacers; the first lens group is disposed in the first lens barrel, and the first lens group includes a first lens, a second lens, and a third lens having a positive refractive power in sequence from an object side to an image side; the second lens group is disposed in the second lens barrel, the second lens group includes a fourth lens having a negative refractive power and a fifth lens in sequence from an object side to an image side, an object-side surface of the fourth lens is a concave surface, and an image-side surface of the fourth lens is a convex surface; the plurality of spacers at least include a first spacer, a second spacer, and a fourth spacer, wherein an internal diameter of the fourth spacer is minimum, the first spacer is located on an image side of the first lens and partially abuts against an image-side surface of the first lens, the second spacer is located on an image side of the second lens and partially abuts against an image-side surface of the second lens, and the fourth spacer is located on an image side of the fourth lens and partially abuts against an image-side surface of the fourth lens; and an effective focal length f5 of the fifth lens, an abbe number V5 of the fifth lens, and an external diameter D4m of an image side of the fourth spacer meet $-0.1<f5/V5/D4m<0.3$.

The optical imaging lens assembly of the disclosure consists of the first lens barrel, the first lens group disposed in the first lens barrel, the second lens barrel, the second lens group disposed in the second lens barrel, and the plurality of spacers; and the first lens group consists of three lenses, and the second lens group consists of two lenses. By restraining $-0.1<f5/V5/D4m<0.3$, the chromatic aberration of an optical system may be effectively optimized, such that purple fringes during imaging is significantly improved, so as to ensure imaging quality.

Definitely, in this implementation, other parametric formulas in the above implementations may also be included, and are not described herein again.

In some embodiments, the optical imaging lens assembly may further include protective glass for protecting a photosensitive element on the imaging surface.

The optical imaging lens assembly in the disclosure may use a plurality of lenses, for example, five lenses described above. In the disclosure, at least one of surfaces of each lens is an aspheric surface. An aspheric lens has a characteristic that a curvature keeps changing from the center of the lens to the periphery of the lens. Unlike a spherical lens with a constant curvature from the center of the lens to the periphery of the lens, the aspheric lens has the characteristic of a better curvature radius and the advantages of improving distortions and improving astigmatic aberrations. By using the aspheric lens, aberrations during imaging may be eliminated as much as possible, thereby improving the imaging quality.

However, those skilled in the art should know that the number of the lenses forming the optical imaging lens assembly may be changed without departing from the technical solutions claimed in the disclosure to achieve each result and advantage described in the specification. For example, although descriptions are made in the implementation with five lenses as an example, the optical imaging lens assembly includes, but is not limited to, five lenses. If necessary, the optical imaging lens assembly may further include another number of lenses.

Figure 2:
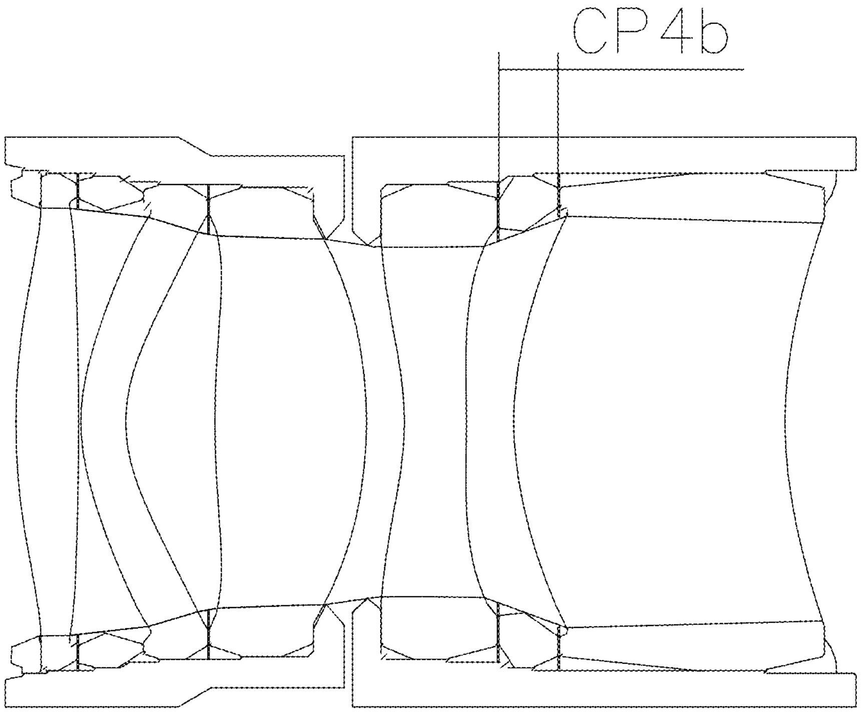
FIG. 2 is another dimensioning diagram of an optical imaging lens assembly according to an embodiment of the disclosure.

FIG. 1 shows a schematic structural diagram of an optical imaging lens assembly according to the disclosure. FIG. 2 shows another schematic structural diagram of an optical imaging lens assembly according to the disclosure. Parameters of dAs, D2m, d2m, D1bm, d1bs, d1m, d4s, D4m, dBs, LA, LB, CP1, CP1b, CP2, CP2b, CP4, EP24, and EPB4 are marked in FIG. 1, so as to clearly and intuitively understand the meaning of the parameters. The parameter of CP4b is indicated in FIG. 2, so as to clearly and intuitively understand the meaning of the parameter. In order to facilitate the optical imaging lens assembly, as well as specific face shapes, these parameters are not shown in the drawings when specific embodiments are described subsequently.

Examples of specific surface types and parameters of the optical imaging lens assembly applicable to the above-mentioned implementation mode will further be described below with reference to the drawings.

It is to be noted that, there is a first state, a second state, and a third state in embodiments below, and parameters such as the curvature radii and center thicknesses of the first lens to the fifth lens of the optical imaging lens assembly in the first state, the second state, and the third state in the same embodiment, as well as a gap distance between the lenses and a high order coefficient, are the same. However, parameters such as the thicknesses, internal diameters, and external diameters of the first lens barrel, second lens barrel, first spacer, second spacer, and fourth spacer, as well as the shapes of partial lenses are different. Or rather, main structures for imaging are the same, and auxiliary structures for image are different.

It is to be noted that, any one of the embodiments in Embodiment I to Embodiment III is applicable to all embodiments of the disclosure.

Embodiment I

Figure 3:
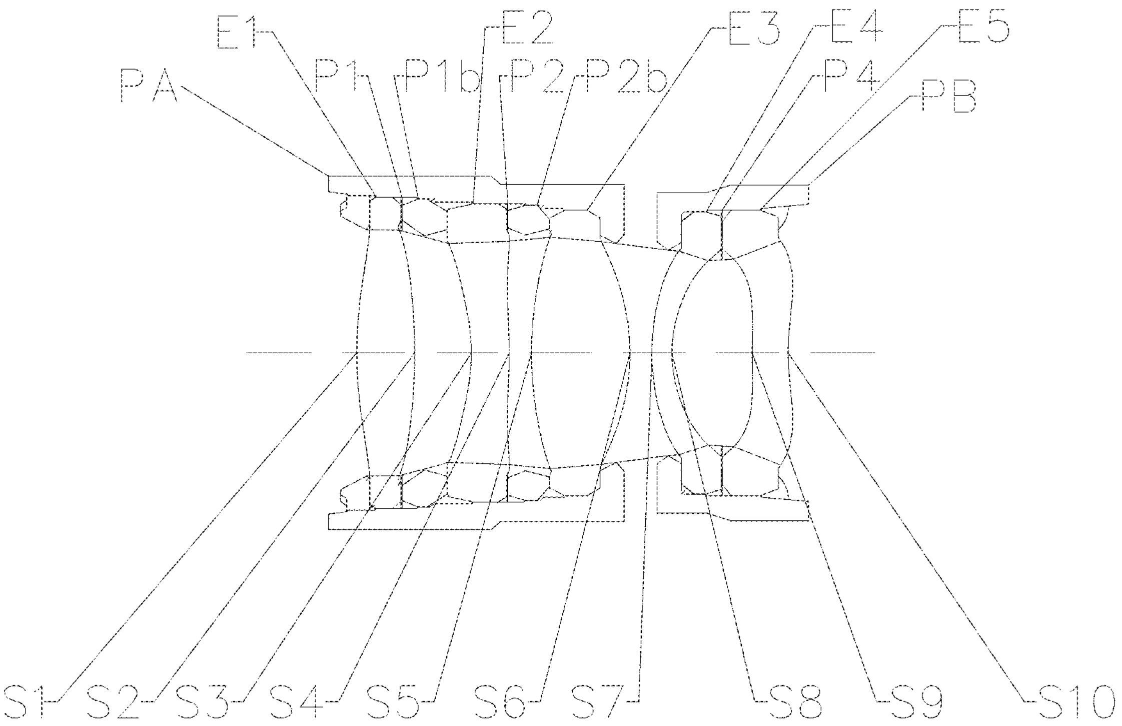
FIG. 3 is a schematic structural diagram of an optical imaging lens assembly in a first state according to Embodiment I of the disclosure.
Figure 4:
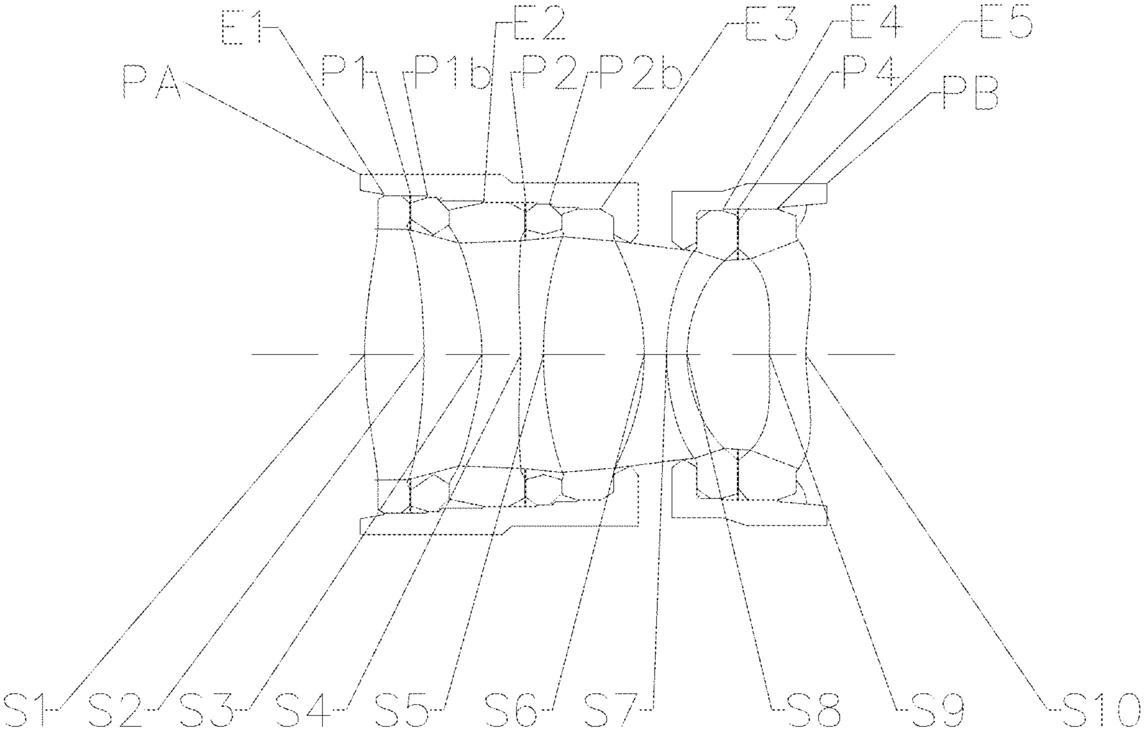
FIG. 4 is a schematic structural diagram of an optical imaging lens assembly in a second state according to Embodiment I of the disclosure.
Figure 5:
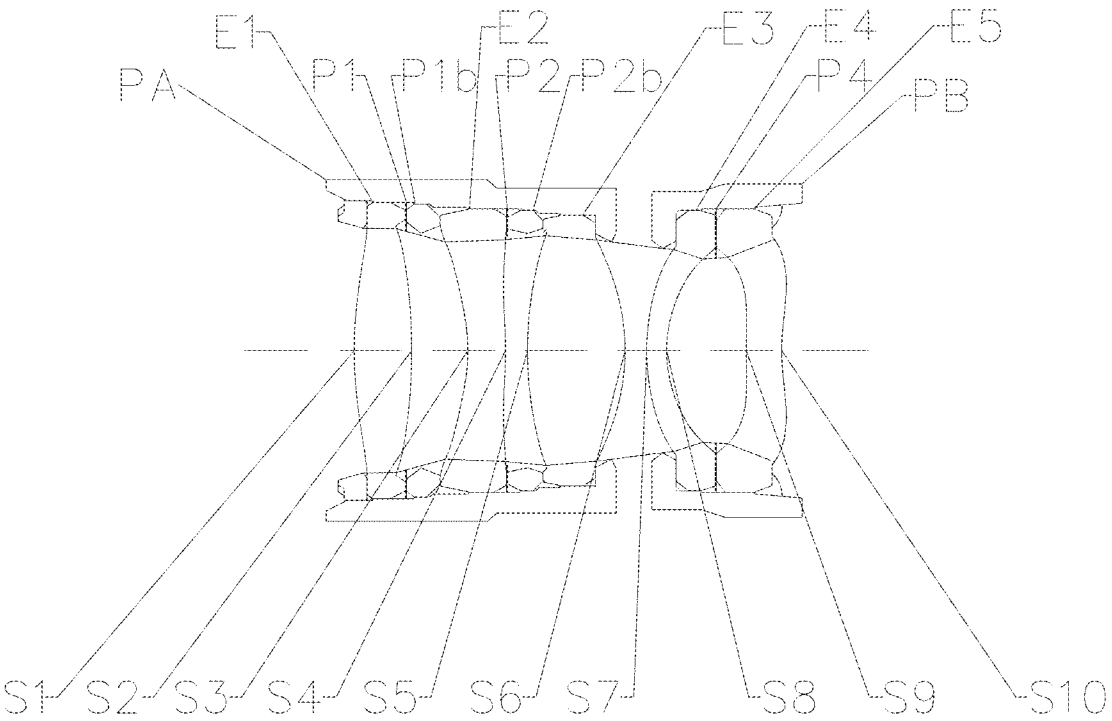
FIG. 5 is a schematic structural diagram of an optical imaging lens assembly in a third state according to Embodiment I of the disclosure.

As shown in FIG. 3 to FIG. 9, an optical imaging lens assembly according to Embodiment I is described. FIG. 3 shows a schematic structural diagram of the optical imaging lens assembly in a first state according to Embodiment I; FIG. 4 shows a schematic structural diagram of the optical imaging lens assembly in a second state according to Embodiment I; and FIG. 5 shows a schematic structural diagram of the optical imaging lens assembly in a third state according to Embodiment I.

As shown in FIG. 3 to FIG. 5, the optical imaging lens assembly includes a first lens barrel PA, a first lens group disposed in the first lens barrel, a second lens barrel PB, a second lens group disposed in the second lens barrel, and a plurality of spacers. The second lens barrel PB is located on an image side of the first lens barrel PA. The first lens barrel PA includes a first lens E1, a first spacer P1, a first auxiliary spacer P1*b*, a second lens E2, a second spacer P2, a second auxiliary spacer P2*b*, and a third lens E3 in sequence from an object side to the image side. The second lens barrel PB includes a fourth lens E4, a fourth spacer P4, and a fifth lens E5 in sequence from an object side to an image side.

As shown in FIG. 3, in the first state of the optical imaging lens assembly, an object-side surface S1 of the first lens partially abuts against the first lens barrel PA. An object-side surface and image-side surface of the first spacer P1 respectively partially bear and abut against an image-side surface S2 of the first lens and an object-side surface of the first auxiliary spacer P1*b*, and an image-side surface of the first auxiliary spacer P1*b* partially bears and abuts against an object-side surface S3 of the second lens. An object-side surface and image-side surface of the second spacer P2 respectively partially bear and abut against an image-side surface S4 of the second lens and an object-side surface of the second auxiliary spacer P2*b*, and an image-side surface of the second auxiliary spacer P2*b* partially bears and abuts against an object-side surface S5 of the third lens. An object-side surface and image-side surface of the fourth spacer P4 respectively partially abut against an image-side surface S8 of the fourth lens and an object-side surface S9 of the fifth lens. An image-side surface S10 of the fifth lens is fixed with an inner wall surface of the second lens barrel PB through glue dispensing.

As shown in FIG. 4, in a second state of the optical imaging lens assembly, a bearing and abutting manner of each spacer is the same as the first state, may be referred to related description in the first state, and is not described herein again.

As shown in FIG. 5, in a third state of the optical imaging lens assembly, a bearing and abutting manner of each spacer is the same as the first state, may be referred to related description in the first state, and is not described herein again.

To sum up, structure parameters of the optical imaging lens assembly in Embodiment I in the first state 1-1, second state 1-2, and third state 1-3 are shown in Table 1. (In mm)

TABLE 1

| Parameter/state | 1-1 | 1-2 | 1-3 |
|---|---|---|---|
| d1m | 7.62 | 7.59 | 7.49 |
| D1bs | 8.29 | 8.76 | 8.06 |
| D1bm | 7.71 | 7.91 | 7.86 |
| d2m | 7.66 | 6.99 | 7.2 |
| D2m | 9.3 | 9.3 | 8.9 |
| d4s | 5.8 | 5.83 | 5.85 |
| D4m | 8.9 | 8.9 | 8.9 |
| dAs | 10.08 | 10.08 | 10.08 |
| dBs | 6.93 | 6.93 | 6.93 |
| EPB4 | 2.06 | 2.06 | 2.06 |

TABLE 1-continued

| Parameter/state | 1-1 | 1-2 | 1-3 |
|---|---|---|---|
| EP24 | 6.85 | 6.64 | 6.74 |
| LA | 9.49 | 8.73 | 9.39 |
| LB | 4.86 | 4.86 | 4.86 |
| CP1 | 0.03 | 0.03 | 0.03 |
| CP1b | 1.46 | 1.21 | 1.09 |
| CP2 | 0.03 | 0.03 | 0.03 |
| CP2b | 1.34 | 1.13 | 1.15 |
| CP4 | 0.03 | 0.03 | 0.03 |

In Embodiment I, the object-side surface S1 of the first lens is a convex surface, and the image-side surface S2 of the first lens is a concave surface. The object-side surface S3 of the second lens is a concave surface, and the image-side surface S4 of the second lens is a convex surface. The object-side surface S5 of the third lens is a convex surface, and the image-side surface S6 of the third lens is a convex surface. An object-side surface S7 of the fourth lens is a concave surface, and the image-side surface S8 of the fourth lens is a convex surface. The object-side surface S9 of the fifth lens is a concave surface, and the image-side surface S10 of the fifth lens is a concave surface.

In Embodiment I, an effective focal length f1 of the first lens is 16.82 mm, an effective focal length f2 of the second lens is −9.43 mm, an effective focal length f3 of the third lens is 6.17 mm, an effective focal length f4 of the fourth lens is −50.84 mm, an effective focal length f5 of the fifth lens is-10.22 mm, an effective focal length F1 of the first lens group is 8.96 mm, an effective focal length F2 of the second lens group is −8.03 mm, an effective focal length f of the optical imaging lens assembly is 14.21 mm, a maximum semi-Field Of View (Semi-FOV) of the optical imaging lens assembly is 16.860, and an Entrance Pupil Diameter (EPD) of the optical imaging lens assembly is 7.69 mm.

Table 2 shows a basic structure parameter table of the optical imaging lens assembly in Embodiment I; and curvature radius, and thickness/distance are all in millimeters (mm).

TABLE 2

| | | | | Material | | Effec- |
|---|---|---|---|---|---|---|
| Surface number | Surface type | Curvature radius | Thick-ness | Refractive index | Abbe number | tive radius |
| OBJ | Spherical surface | Infinite | Infinite | | | |
| STO | Spherical surface | Infinite | −0.8120 | | | 3.8426 |
| S1 | Aspheric surface | 6.6230 | 1.4139 | 1.54 | 56.11 | 3.8426 |
| S2 | Aspheric surface | 21.9744 | 2.3896 | | | 3.7281 |
| S3 | Aspheric surface | −3.2254 | 0.5424 | 1.67 | 19.24 | 3.4189 |
| S4 | Aspheric surface | −6.9590 | 0.0784 | | | 3.6833 |
| S5 | Aspheric surface | 6.3020 | 3.0415 | 1.56 | 37.32 | 3.8802 |
| S6 | Aspheric surface | −6.5572 | 0.7000 | | | 3.6090 |
| S7 | Aspheric surface | −26.2149 | 0.5982 | 1.54 | 56.11 | 3.3886 |
| S8 | Aspheric surface | −476.9891 | 3.0181 | | | 3.5491 |
| S9 | Aspheric surface | −11.4598 | 0.5900 | 1.54 | 56.11 | 2.9167 |
| S10 | Aspheric surface | 11.0600 | 2.3472 | | | 3.5404 |

TABLE 2-continued

| Surface number | Surface type | Curvature radius | Thick-ness | Material Refractive index | Material Abbe number | Effec-tive radius |
|---|---|---|---|---|---|---|
| S11 | Spherical surface | Infinite | 0.2100 | 1.52 | 64.2 | 4.1118 |
| S12 | Spherical surface | Infinite | 1.4704 | | | 4.1398 |
| S13 | Spherical surface | Infinite | 0.0000 | | | 4.4456 |

In Embodiment I, the object-side surfaces and image-side surfaces of the first lens to the fifth lens all are aspheric surfaces; and the surface type of each aspheric lens may be limited by using, but not limited to, the following aspheric equation.

$$x = \frac{ch^2}{1 + \sqrt{1 - (k+1)c^2h^2}} + \sum Aih^i \qquad \text{Formula (1)}$$

Where x is a distance vector height from the vertex of the aspheric surface when the height of the aspheric surface in an optical axis direction is h; c is a paraxial curvature of the aspheric surface, c=1/R, i.e., the paraxial curvature c is the reciprocal of the curvature radius R in Table 1; k is the conic coefficient; and Ai is a correction factor for an ith order of the aspheric surface. Table 3 blow provides high order coefficients A4, A6, A8, A10, A12, A14, A16, A18, A20, A22, A24, A26, A28, and A30 applied to various aspheric surfaces S1-S10 in Embodiment I.

TABLE 3

| Surface number | A4 | A6 | A8 | A10 | A12 | A14 | A16 |
|---|---|---|---|---|---|---|---|
| S1 | −3.2052E−04 | 4.4064E−05 | −4.9313E−05 | 3.5062E−05 | −1.2985E−05 | 3.0095E−06 | −4.6367E−07 |
| S2 | −1.8797E−04 | −2.5126E−05 | 6.8255E−05 | −1.7785E−05 | 2.7210E−06 | −2.7592E−07 | 1.7595E−08 |
| S3 | 2.9356E−02 | −6.5101E−03 | 2.5510E−03 | −9.9756E−04 | 2.8211E−04 | −5.6567E−05 | 8.0843E−06 |
| S4 | 1.6349E−02 | 8.7464E−04 | −3.7075E−04 | −9.6303E−06 | 1.5736E−05 | −3.0835E−06 | 3.2479E−07 |
| S5 | −1.2967E−02 | 6.4527E−03 | −2.4983E−03 | 7.6007E−04 | −1.7930E−04 | 3.1538E−05 | −4.0001E−06 |
| S6 | −1.0273E−03 | 6.1326E−04 | −8.6624E−04 | 6.9113E−04 | −3.3641E−04 | 1.0928E−04 | −2.4793E−05 |
| S7 | 5.1436E−03 | −8.5428E−04 | 1.9749E−04 | 2.0978E−05 | −4.0141E−05 | 1.6296E−05 | −3.7716E−06 |
| S8 | 4.7258E−03 | −1.1499E−03 | 5.7333E−04 | −2.5151E−04 | 7.6767E−05 | −1.6546E−05 | 2.4748E−06 |
| S9 | −2.0533E−02 | 4.8568E−03 | −3.2364E−03 | 1.9414E−03 | −7.1764E−04 | 1.1584E−04 | 2.0609E−05 |
| S10 | −1.9546E−02 | 5.2819E−03 | −2.6830E−03 | 1.2685E−03 | −4.0606E−04 | 7.6180E−05 | −4.8268E−06 |

| Surface number | A18 | A20 | A22 | A24 | A26 | A28 | A30 |
|---|---|---|---|---|---|---|---|
| S1 | 4.8244E−08 | −3.3533E−09 | 1.4925E−10 | −3.8476E−12 | 4.3702E−14 | 0.0000E+00 | 0.0000E+00 |
| S2 | −6.3725E−10 | 9.9932E−12 | 0.0000E+00 | 0.0000E+00 | 0.0000E+00 | 0.0000E+00 | 0.0000E+00 |
| S3 | −8.1936E−07 | 5.7613E−08 | −2.6764E−09 | 7.3980E−11 | −9.2289E−13 | 0.0000E+00 | 0.0000E+00 |
| S4 | −2.0309E−08 | 7.1038E−10 | −1.0728E−11 | 0.0000E+00 | 0.0000E+00 | 0.0000E+00 | 0.0000E+00 |
| S5 | 3.5254E−07 | −2.0278E−08 | 6.5302E−10 | −4.8332E−12 | −3.5582E−13 | 8.4763E−15 | 0.0000E+00 |
| S6 | 4.0153E−06 | −4.6717E−07 | 3.8750E−08 | −2.2359E−09 | 8.5267E−11 | −1.9316E−12 | 1.9679E−14 |
| S7 | 5.6089E−07 | −5.4576E−08 | 3.3660E−09 | −1.1957E−10 | 1.8652E−12 | 0.0000E+00 | 0.0000E+00 |
| S8 | −2.4967E−07 | 1.6145E−08 | −6.0306E−10 | 9.8858E−12 | 0.0000E+00 | 0.0000E+00 | 0.0000E+00 |
| S9 | −1.6410E−05 | 4.4403E−06 | −7.0792E−07 | 7.1852E−08 | −4.5789E−09 | 1.6765E−10 | −2.6970E−12 |
| S10 | −1.3575E−06 | 4.2954E−07 | −6.0458E−08 | 5.0701E−09 | −2.5976E−10 | 7.5336E−12 | −9.5065E−14 |

Figure 6:
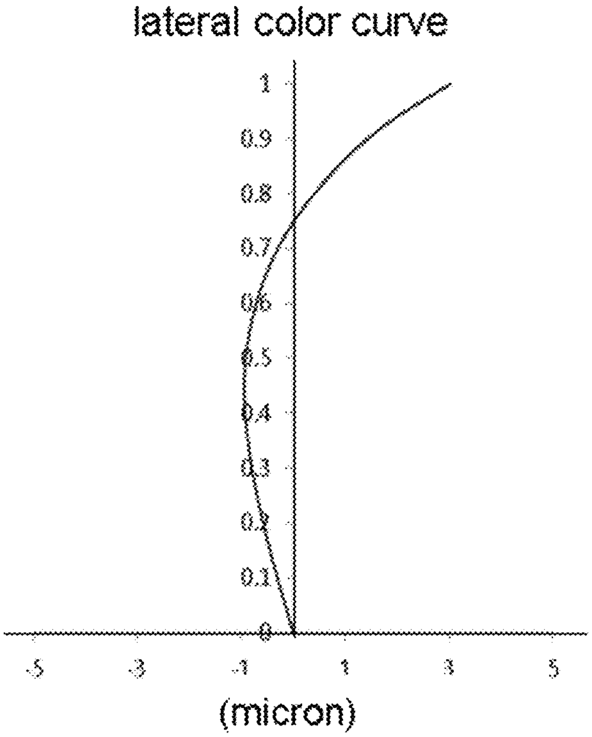
FIG. 6 to FIG. 9 respectively show a lateral color curve, a longitudinal aberration curve, an astigmatism curve, and a distortion curve of an optical imaging lens assembly according to Embodiment I of the disclosure.
Figure 7:
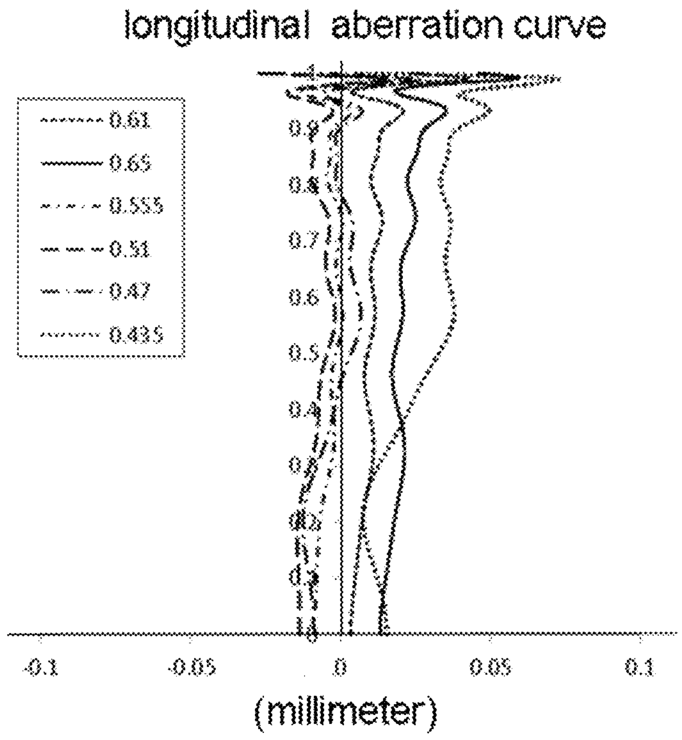
Figure 8:
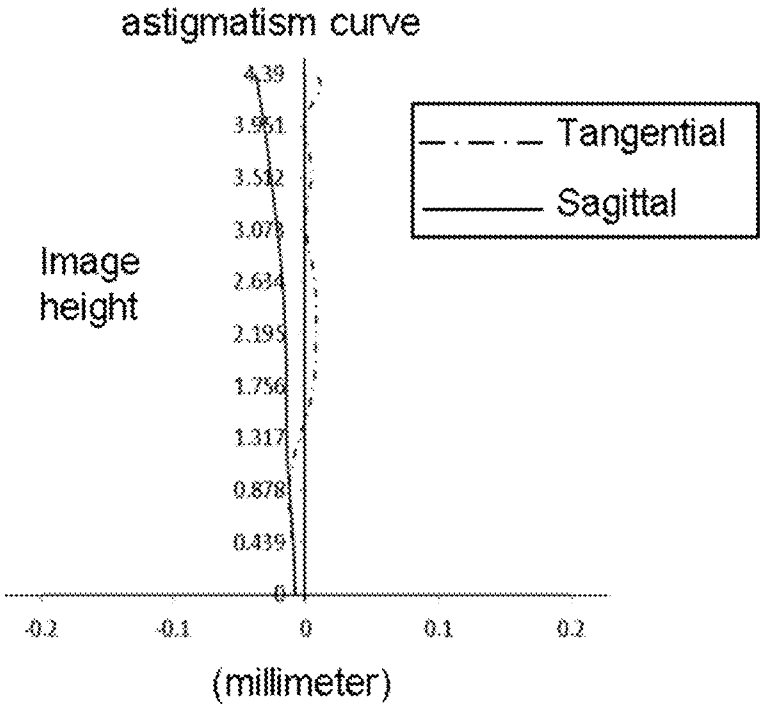
Figure 9:
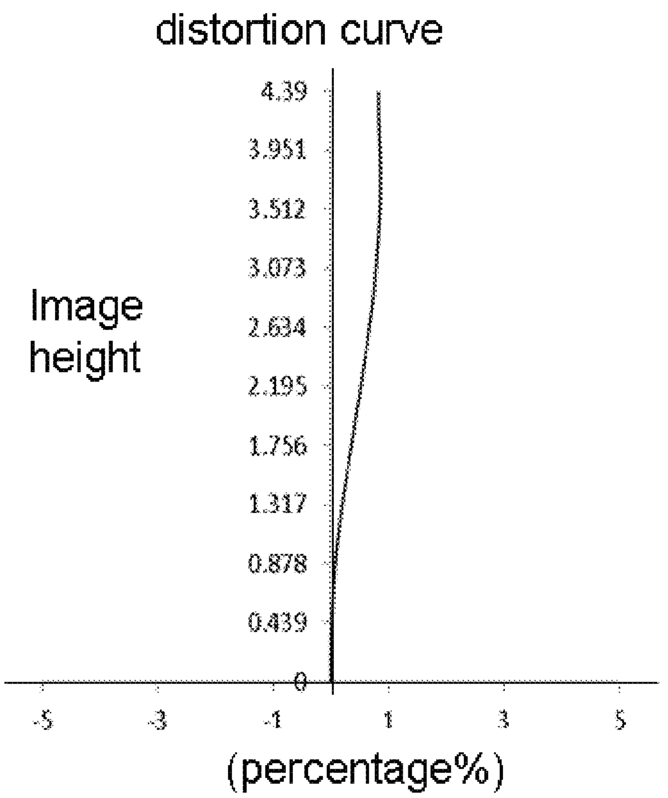

FIG. 6 shows a lateral color curve of the optical imaging lens assembly in Embodiment I; and the lateral color curve represents deviation of different image heights on the imaging surface after the light passes through the optical camera lens. FIG. 7 shows a longitudinal aberration curve of the optical imaging lens assembly in Embodiment I; and the longitudinal aberration curve represents deviation of a convergence focal point after light with different wavelengths passes through the optical imaging lens assembly. FIG. 8 shows an astigmatism curve of the optical imaging lens assembly in Embodiment I; and the astigmatism curve represents a tangential image surface curvature and a sagittal image surface curvature. FIG. 9 shows a distortion curve of the optical imaging lens assembly in Embodiment I; and the distortion curve represents distortion values corresponding to different FOVs.

According to FIG. 6 to FIG. 9, it may be learned that, the optical imaging lens assembly provided in Embodiment I may achieve desirable imaging quality.

Embodiment II

Figure 10:
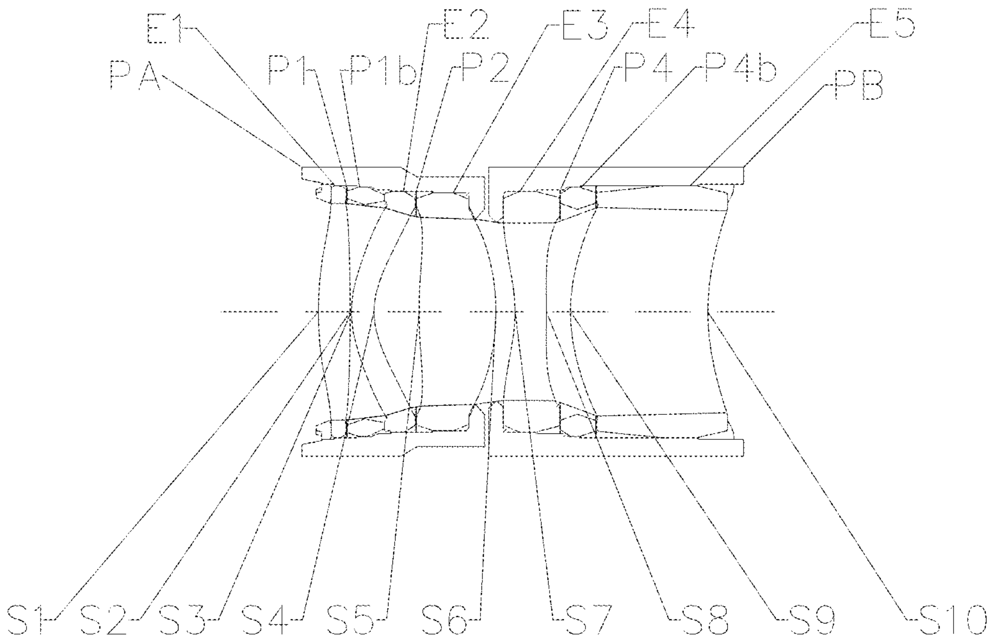
FIG. 10 is a schematic structural diagram of an optical imaging lens assembly in a first state according to Embodiment II of the disclosure.
Figure 11:
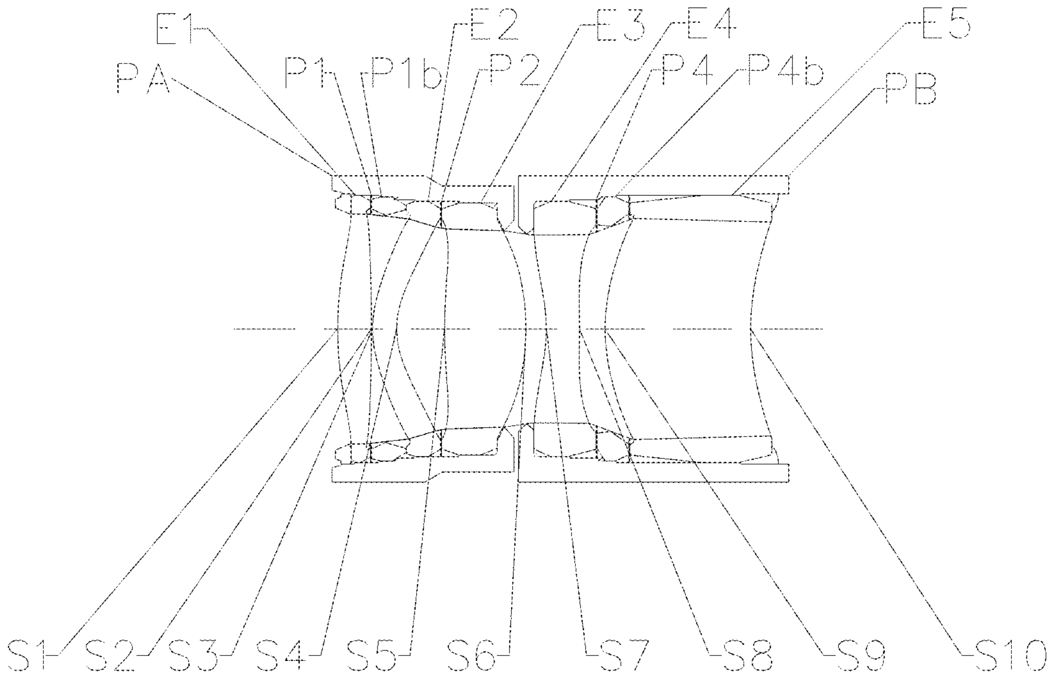
FIG. 11 is a schematic structural diagram of an optical imaging lens assembly in a second state according to Embodiment II of the disclosure.
Figure 12:
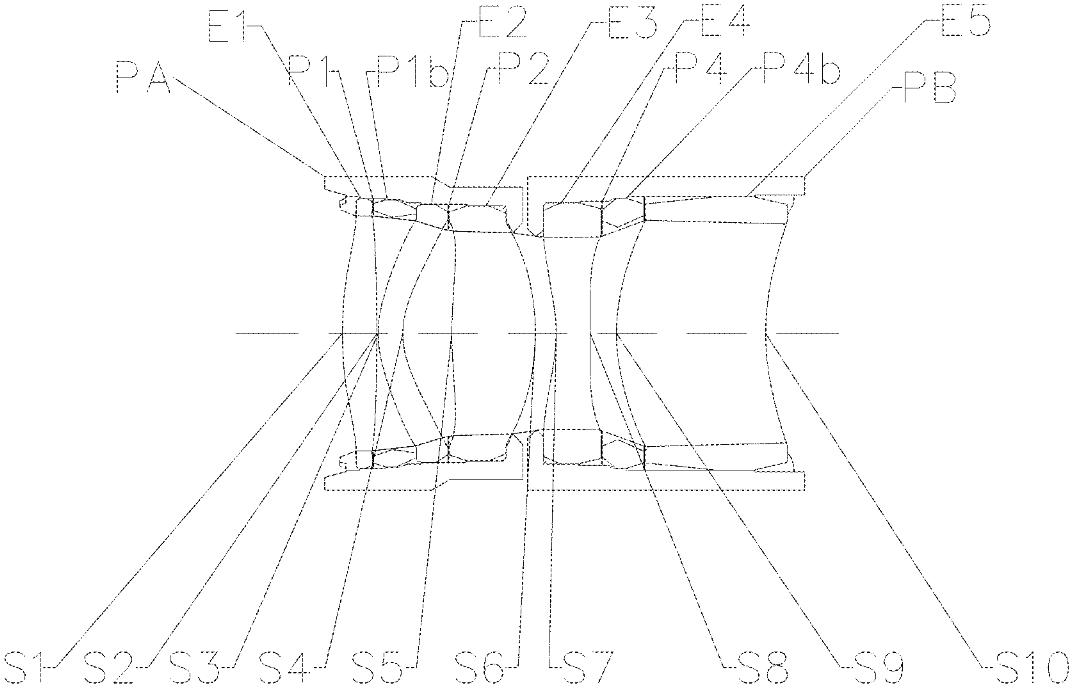
FIG. 12 is a schematic structural diagram of an optical imaging lens assembly in a third state according to Embodiment II of the disclosure.

As shown in FIG. 10 to FIG. 16, an optical imaging lens assembly according to Embodiment II is described. FIG. 10 shows a schematic structural diagram of the optical imaging lens assembly in a first state according to Embodiment II; FIG. 11 shows a schematic structural diagram of the optical imaging lens assembly in a second state according to Embodiment II; and FIG. 12 shows a schematic structural diagram of the optical imaging lens assembly in a third state according to Embodiment II.

As shown in FIG. 10 to FIG. 12, the optical imaging lens assembly includes a first lens barrel PA, a first lens group disposed in the first lens barrel, a second lens barrel PB, a second lens group disposed in the second lens barrel, and a plurality of spacers. The second lens barrel PB is located on an image side of the first lens barrel PA. The first lens barrel PA includes a first lens E1, a first spacer P1, a first auxiliary spacer P1*b*, a second lens E2, a second spacer P2, and a third lens E3 in sequence from an object side to the image side. The second lens barrel PB includes a fourth lens E4, a fourth spacer P4, a fourth auxiliary spacer P4*b*, and a fifth lens E5 in sequence from an object side to an image side.

As shown in FIG. 10, in the first state of the optical imaging lens assembly, an object-side surface S1 of the first lens partially abuts against the first lens barrel PA. An object-side surface and image-side surface of the first spacer P1 respectively partially bear and abut against an image-side surface S2 of the first lens and an object-side surface of the first auxiliary spacer P1*b*, and an image-side surface of the first auxiliary spacer P1*b* partially bears and abuts against an object-side surface S3 of the second lens. An object-side surface and image-side surface of the second spacer P2 respectively partially bear and abut against an image-side surface S4 of the second lens and an object-side surface S5 of the third lens. An object-side surface and image-side surface of the fourth spacer P4 respectively partially bear and abut against an image-side surface S8 of the fourth lens and an object-side surface of the fourth auxiliary spacer P4*b*, and an image-side surface of the fourth auxiliary spacer P4*b* partially bears and abuts against an object-side surface S9 of the fifth lens. An image-side surface S10 of the fifth lens is fixed with an inner wall surface of the second lens barrel PB through glue dispensing.

As shown in FIG. 11, in a second state of the optical imaging lens assembly, a bearing and abutting manner of each spacer is the same as the first state, may be referred to related description in the first state, and is not described herein again.

As shown in FIG. 12, in a third state of the optical imaging lens assembly, a bearing and abutting manner of each spacer is the same as the first state, may be referred to related description in the first state, and is not described herein again.

To sum up, structure parameters of the optical imaging lens assembly in Embodiment II in the first state 2-1, second state 2-2, and third state 2-3 are shown in Table 4. (In mm)

TABLE 4

| Parameter/state | 2-1 | 2-2 | 2-3 |
|---|---|---|---|
| d1m | 7.64 | 7.61 | 7.73 |
| D1bs | 8.02 | 8.02 | 7.98 |
| D1bm | 7.85 | 7.98 | 7.77 |
| d2m | 6.72 | 6.75 | 6.71 |
| D2m | 8.5 | 8.5 | 8.35 |
| d4s | 6.41 | 6.47 | 6.39 |
| D4m | 8.6 | 8.6 | 8.6 |
| dAs | 9.41 | 9.25 | 9.41 |
| dBs | 6.8 | 6.8 | 6.8 |
| EPB4 | 2.58 | 2.67 | 2.47 |
| EP24 | 5.22 | 5.31 | 5.11 |
| LA | 6.65 | 6.25 | 6.65 |
| LB | 9.28 | 9.28 | 9.28 |
| CP1 | 0.03 | 0.03 | 0.03 |
| CP1b | 1.36 | 1.19 | 1.44 |
| CP2 | 0.03 | 0.03 | 0.03 |
| CP4 | 0.03 | 0.03 | 0.03 |
| CP4b | 1.29 | 1.09 | 1.39 |

In Embodiment II, the object-side surface S1 of the first lens is a convex surface, and the image-side surface S2 of the first lens is a convex surface. The object-side surface S3 of the second lens is a convex surface, and the image-side surface S4 of the second lens is a concave surface. The object-side surface S5 of the third lens is a convex surface, and the image-side surface S6 of the third lens is a convex surface. An object-side surface S7 of the fourth lens is a concave surface, and the image-side surface S8 of the fourth lens is a convex surface. The object-side surface S9 of the fifth lens is a convex surface, and the image-side surface S10 of the fifth lens is a concave surface.

In Embodiment II, an effective focal length f1 of the first lens is 18.93 mm, an effective focal length f2 of the second lens is −29.59 mm, an effective focal length f3 of the third lens is 9.93 mm, an effective focal length f4 of the fourth lens is −8.73 mm, an effective focal length f5 of the fifth lens is 18.27 mm, an effective focal length F1 of the first lens group is 9.55 mm, an effective focal length F2 of the second lens group is −12.65 mm, an effective focal length f of the optical imaging lens assembly is 14.22 mm, a maximum semi-Field Of View (Semi-FOV) of the optical imaging lens assembly is 28.240, and an Entrance Pupil Diameter (EPD) of the optical imaging lens assembly is 7.66 mm.

Table 5 shows a basic structure parameter table of the optical imaging lens assembly in Embodiment II; and curvature radius, and thickness/distance are all in millimeters (mm).

TABLE 5

| Surface number | Surface type | Curvature radius | Thick-ness | Material: Refractive index | Material: Abbe number | Effec-tive radius |
|---|---|---|---|---|---|---|
| OBJ | Spherical surface | Infinite | Infinite | | | |
| STO | Spherical surface | Infinite | −0.4329 | | | 3.8275 |
| S1 | Aspheric surface | 13.0737 | 1.1591 | 1.54 | 56.11 | 3.8308 |
| S2 | Aspheric surface | −47.7773 | 0.0400 | | | 3.8228 |
| S3 | Aspheric surface | 3.4959 | 0.8253 | 1.54 | 56.11 | 3.6626 |
| S4 | Aspheric surface | 2.6342 | 1.6444 | | | 3.3955 |
| S5 | Aspheric surface | 15.9038 | 2.7966 | 1.54 | 56.11 | 3.3309 |
| S6 | Aspheric surface | −7.7181 | 0.7000 | | | 3.2729 |
| S7 | Aspheric surface | −4.9250 | 1.1400 | 1.67 | 19.24 | 3.1288 |
| S8 | Aspheric surface | −32.3692 | 0.8750 | | | 3.1413 |
| S9 | Aspheric surface | 5.9358 | 5.0000 | 1.66 | 20.37 | 3.7158 |
| S10 | Aspheric surface | 7.6801 | 3.3321 | | | 3.7742 |
| S11 | Spherical surface | Infinite | 0.2100 | 1.52 | 64.2 | 4.1118 |
| S12 | Spherical surface | Infinite | 1.0000 | | | 4.1398 |
| S13 | Spherical surface | Infinite | 0.0000 | | | 4.3446 |

Table 6 shows polynomial coefficients applied to each of the aspheric surfaces in Embodiment II; and each of the aspheric surface types may be limited by the equation (1) provided in Embodiment II.

TABLE 6

| Surface number | A4 | A6 | A8 | A10 | A12 | A14 | A16 |
|---|---|---|---|---|---|---|---|
| S1 | −3.2052E−04 | 4.4064E−05 | −4.9313E−05 | 3.5062E−05 | −1.2985E−05 | 3.0095E−06 | −4.6367E−07 |
| S2 | −1.8797E−04 | −2.5126E−05 | 6.8255E−05 | −1.7785E−05 | 2.7210E−06 | −2.7592E−07 | 1.7595E−08 |
| S3 | 2.9356E−02 | −6.5101E−03 | 2.5510E−03 | −9.9756E−04 | 2.8211E−04 | −5.6567E−05 | 8.0843E−06 |
| S4 | 1.6349E−02 | 8.7464E−04 | −3.7075E−04 | −9.6303E−06 | 1.5736E−05 | −3.0835E−06 | 3.2479E−07 |
| S5 | −1.2967E−02 | 6.4527E−03 | −2.4983E−03 | 7.6007E−04 | −1.7930E−04 | 3.1538E−05 | −4.0001E−06 |

TABLE 6-continued

| | | | | | | | |
|---|---|---|---|---|---|---|---|
| S6 | −1.0273E−03 | 6.1326E−04 | −8.6624E−04 | 6.9113E−04 | −3.3641E−04 | 1.0928E−04 | −2.4793E−05 |
| S7 | 5.1436E−03 | −8.5428E−04 | 1.9749E−04 | 2.0978E−05 | −4.0141E−05 | 1.6296E−05 | −3.7716E−06 |
| S8 | 4.7258E−03 | −1.1499E−03 | 5.7333E−04 | −2.5151E−04 | 7.6767E−05 | −1.6546E−05 | 2.4748E−06 |
| S9 | −2.0533E−02 | 4.8568E−03 | −3.2364E−03 | 1.9414E−03 | −7.1764E−04 | 1.1584E−04 | 2.0609E−05 |
| S10 | −1.9546E−02 | 5.2819E−03 | −2.6830E−03 | 1.2685E−03 | −4.0606E−04 | 7.6180E−05 | −4.8268E−06 |

| Surface number | A18 | A20 | A22 | A24 | A26 | A28 | A30 |
|---|---|---|---|---|---|---|---|
| S1 | 4.8244E−08 | −3.3533E−09 | 1.4925E−10 | −3.8476E−12 | 4.3702E−14 | 0.0000E+00 | 0.0000E+00 |
| S2 | −6.3725E−10 | 9.9932E−12 | 0.0000E+00 | 0.0000E+00 | 0.0000E+00 | 0.0000E+00 | 0.0000E+00 |
| S3 | −8.1936E−07 | 5.7613E−08 | −2.6764E−09 | 7.3980E−11 | −9.2289E−13 | 0.0000E+00 | 0.0000E+00 |
| S4 | −2.0309E−08 | 7.1038E−10 | −1.0728E−11 | 0.0000E+00 | 0.0000E+00 | 0.0000E+00 | 0.0000E+00 |
| S5 | 3.5254E−07 | −2.0278E−08 | 6.5302E−10 | −4.8332E−12 | −3.5582E−13 | 8.4763E−15 | 0.0000E+00 |
| S6 | 4.0153E−06 | −4.6717E−07 | 3.8750E−08 | −2.2359E−09 | 8.5267E−11 | −1.9316E−12 | 1.9679E−14 |
| S7 | 5.6089E−07 | −5.4576E−08 | 3.3660E−09 | −1.1957E−10 | 1.8652E−12 | 0.0000E+00 | 0.0000E+00 |
| S8 | −2.4967E−07 | 1.6145E−08 | −6.0306E−10 | 9.8858E−12 | 0.0000E+00 | 0.0000E+00 | 0.0000E+00 |
| S9 | −1.6410E−05 | 4.4403E−06 | −7.0792E−07 | 7.1852E−08 | −4.5789E−09 | 1.6765E−10 | −2.6970E−12 |
| S10 | −1.3575E−06 | 4.2954E−07 | −6.0458E−08 | 5.0701E−09 | −2.5976E−10 | 7.5336E−12 | −9.5065E−14 |

Figure 13:
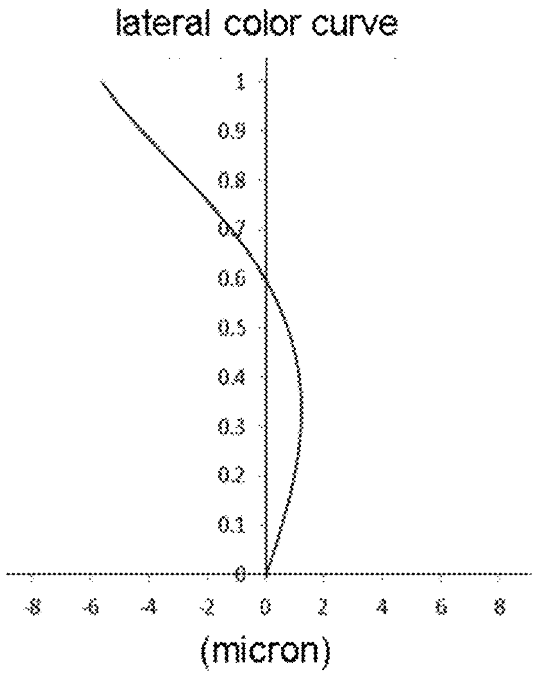
FIG. 13 to FIG. 16 respectively show a lateral color curve, a longitudinal aberration curve, an astigmatism curve, and a distortion curve of an optical imaging lens assembly according to Embodiment II of the disclosure.
Figure 14:
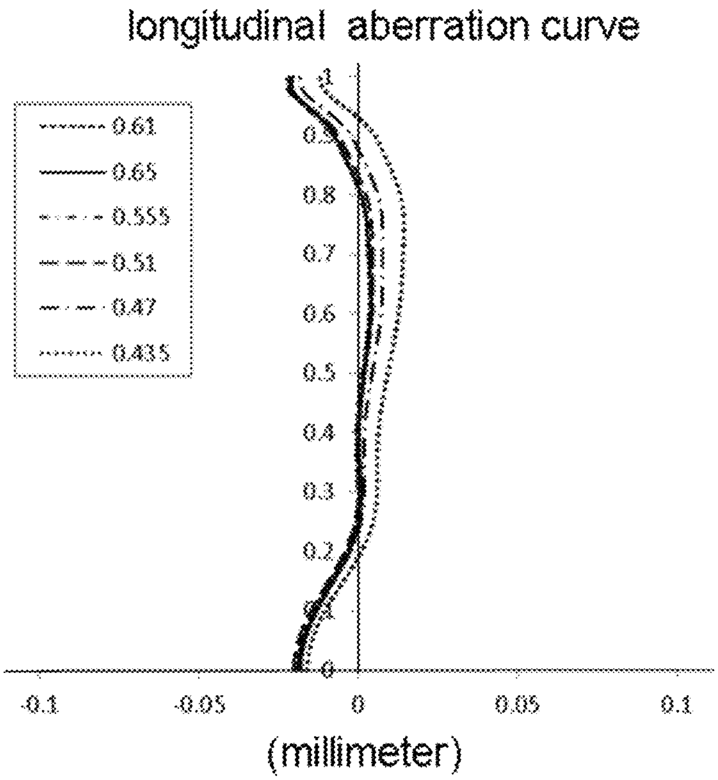
Figure 15:
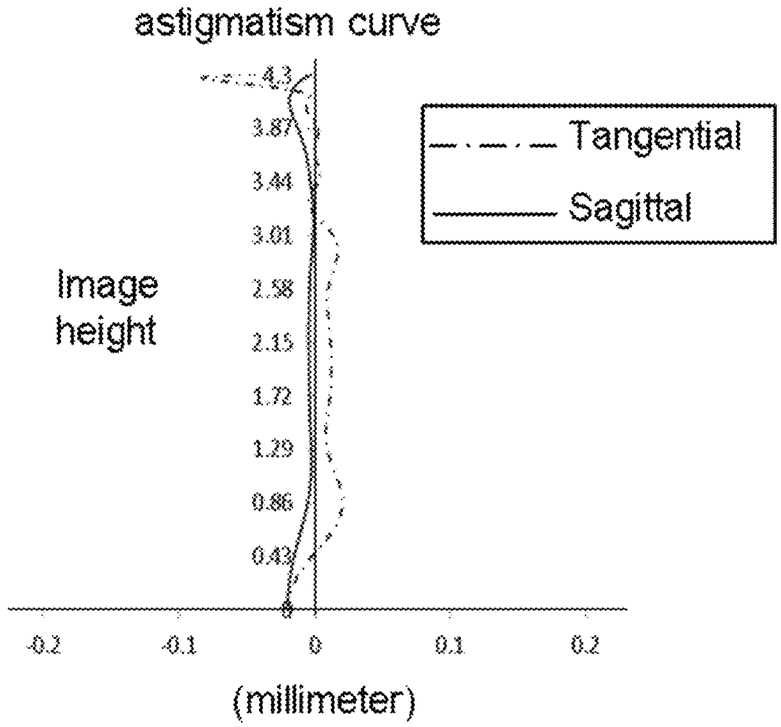
Figure 16:
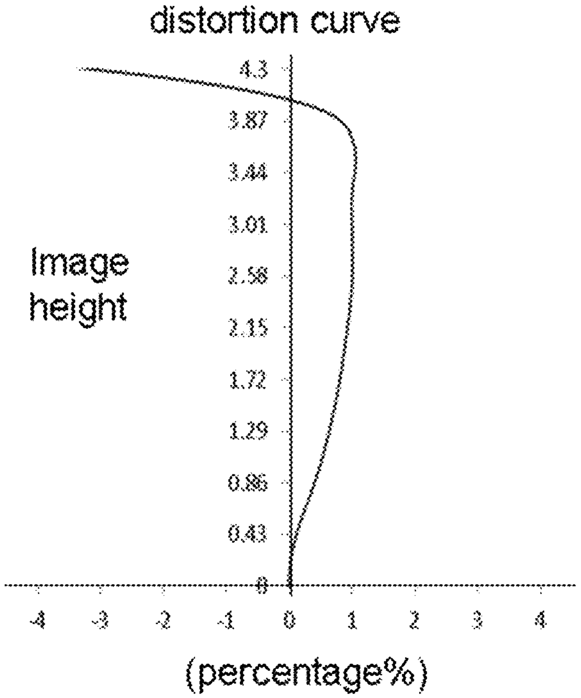

FIG. 13 shows a lateral color curve of the optical imaging lens assembly in Embodiment II; and the lateral color curve represents deviation of different image heights on the imaging surface after the light passes through the optical camera lens. FIG. 14 shows a longitudinal aberration curve of the optical imaging lens assembly in Embodiment II; and the longitudinal aberration curve represents deviation of a convergence focal point after light with different wavelengths passes through the optical imaging lens assembly. FIG. 15 shows an astigmatism curve of the optical imaging lens assembly in Embodiment II; and the astigmatism curve represents a tangential image surface curvature and a sagittal image surface curvature. FIG. 16 shows a distortion curve of the optical imaging lens assembly in Embodiment II; and the distortion curve represents distortion values corresponding to different FOVs.

According to FIG. 13 to FIG. 16, it may be learned that, the optical imaging lens assembly provided in Embodiment II may achieve desirable imaging quality.

Embodiment III

Figure 17:
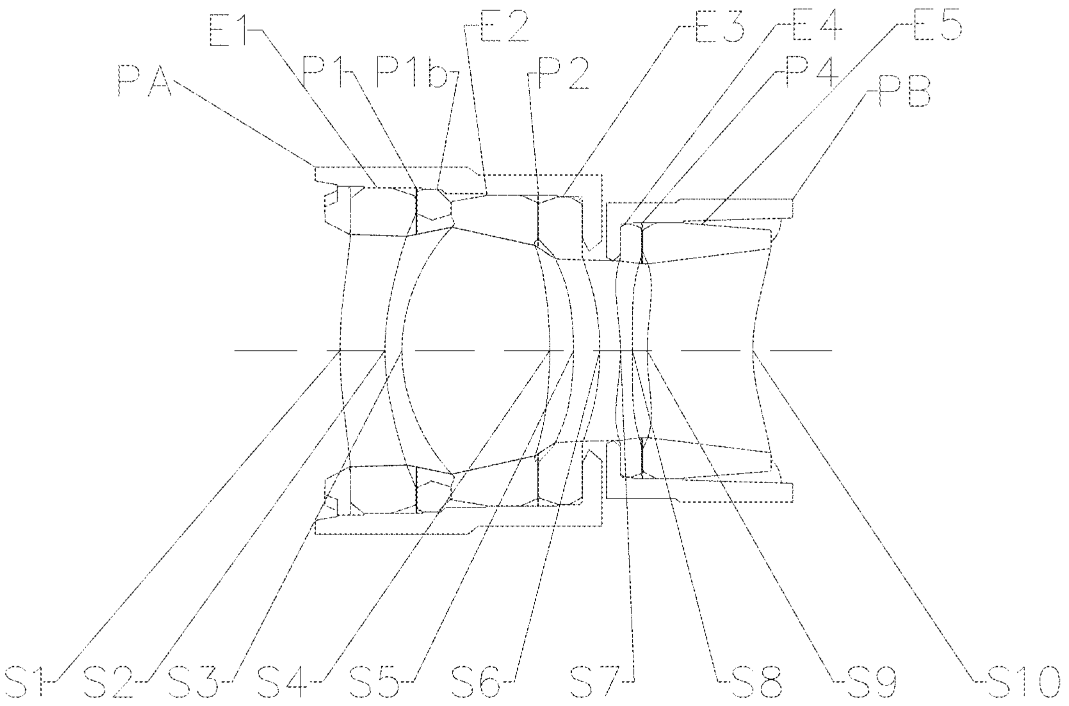
FIG. 17 is a schematic structural diagram of an optical imaging lens assembly in a first state according to Embodiment III of the disclosure.
Figure 18:
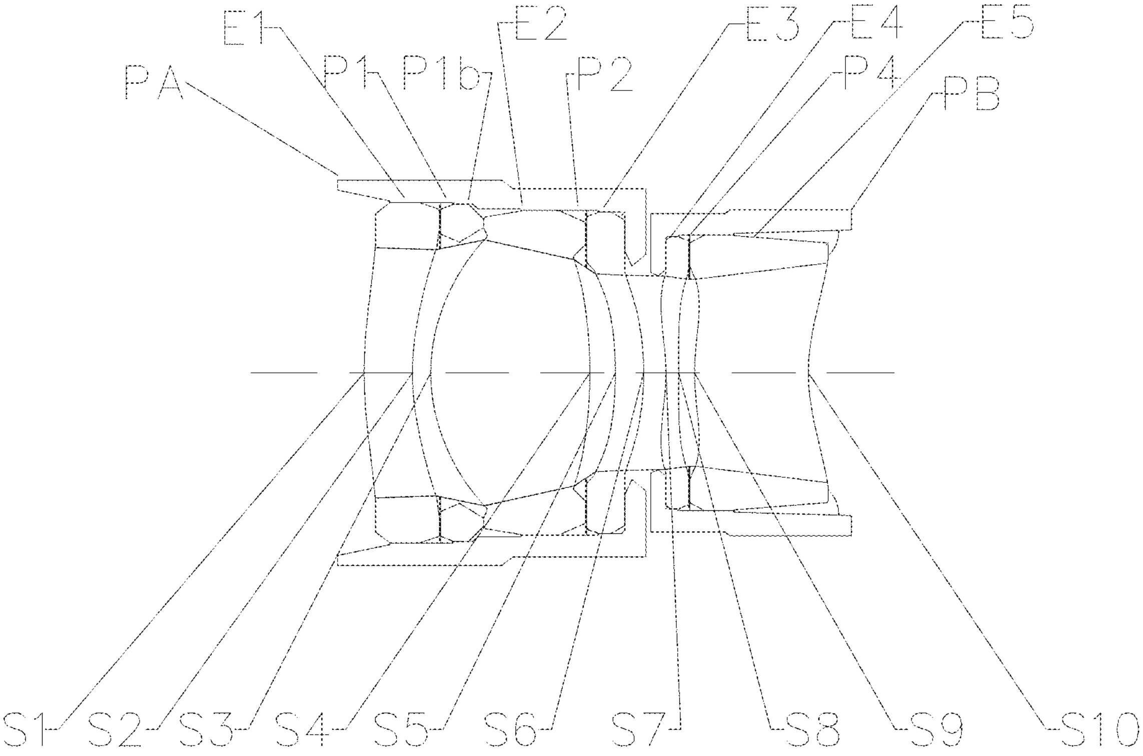
FIG. 18 is a schematic structural diagram of an optical imaging lens assembly in a second state according to Embodiment III of the disclosure.
Figure 19:
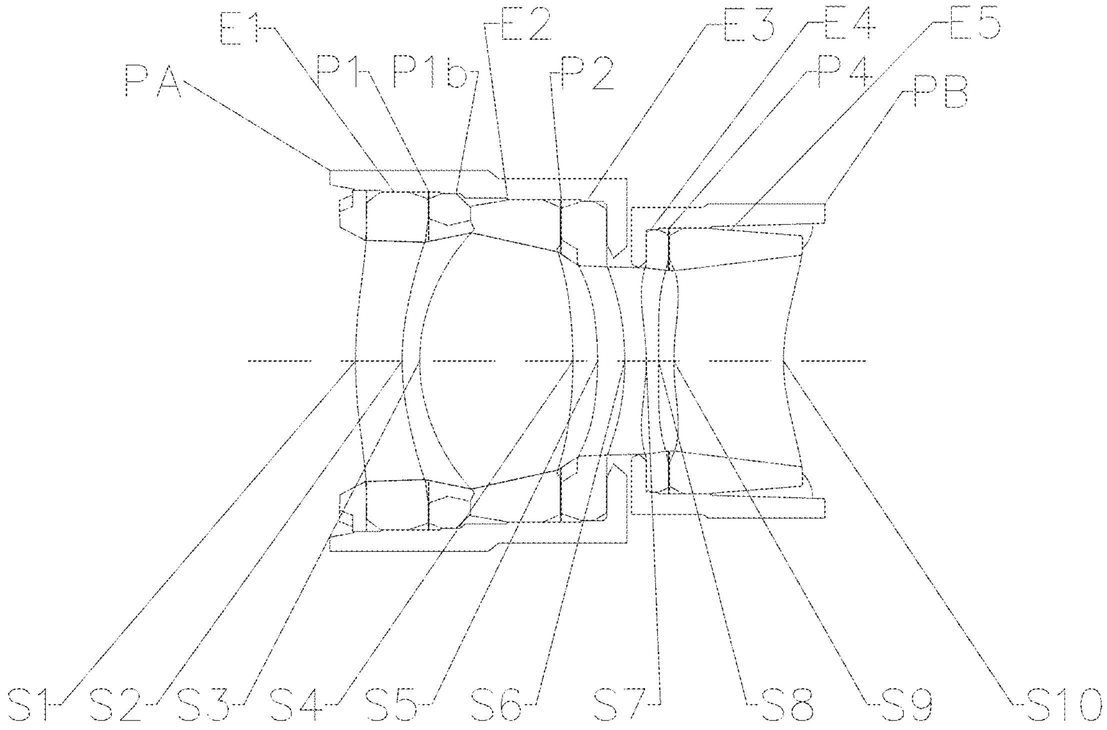
FIG. 19 is a schematic structural diagram of an optical imaging lens assembly in a third state according to Embodiment III of the disclosure.

As shown in FIG. 17 to FIG. 23, an optical imaging lens assembly according to Embodiment III is described. FIG. 17 shows a schematic structural diagram of the optical imaging lens assembly in a first state according to Embodiment III; FIG. 18 shows a schematic structural diagram of the optical imaging lens assembly in a second state according to Embodiment III; and FIG. 19 shows a schematic structural diagram of the optical imaging lens assembly in a third state according to Embodiment III.

As shown in FIG. 17 to FIG. 19, the optical imaging lens assembly includes a first lens barrel PA, a first lens group disposed in the first lens barrel, a second lens barrel PB, a second lens group disposed in the second lens barrel, and a plurality of spacers. The second lens barrel PB is located on an image side of the first lens barrel PA. The first lens barrel PA includes a first lens E1, a first spacer P1, a first auxiliary spacer P1*b*, a second lens E2, a second spacer P2, and a third lens E3 in sequence from an object side to the image side. The second lens barrel PB includes a fourth lens E4, a fourth spacer P4, and a fifth lens E5 in sequence from an object side to an image side.

As shown in FIG. 17, in the first state of the optical imaging lens assembly, an object-side surface S1 of the first lens partially abuts against the first lens barrel PA. An object-side surface and image-side surface of the first spacer P1 respectively partially bear and abut against an image-side surface S2 of the first lens and an object-side surface of the first auxiliary spacer P1*b*, and an image-side surface of the first auxiliary spacer P1*b* partially bears and abuts against an object-side surface S3 of the second lens. An object-side surface and image-side surface of the second spacer P2 respectively partially bear and abut against an image-side surface S4 of the second lens and an object-side surface S5 of the third lens. An object-side surface and image-side surface of the fourth spacer P4 respectively partially bear and abut against an image-side surface S8 of the fourth lens and an object-side surface S9 of the fifth lens. An image-side surface S10 of the fifth lens is fixed with an inner wall surface of the second lens barrel PB through glue dispensing.

As shown in FIG. 18, in a second state of the optical imaging lens assembly, a bearing and abutting manner of each spacer is the same as the first state, may be referred to related description in the first state, and is not described herein again.

As shown in FIG. 19, in a third state of the optical imaging lens assembly, a bearing and abutting manner of each spacer is the same as the first state, may be referred to related description in the first state, and is not described herein again.

To sum up, structure parameters of the optical imaging lens assembly in Embodiment III in the first state 3-1, second state 3-2, and third state 3-3 are shown in Table 7. (In mm)

TABLE 7

| Parameter/state | 3-1 | 3-2 | 3-3 |
|---|---|---|---|
| d1m | 7.64 | 7.56 | 7.57 |
| D1bs | 9.01 | 8.48 | 8.97 |
| D1bm | 8.97 | 8.88 | 8.89 |
| d2m | 6.79 | 6.43 | 6.79 |
| D2m | 10.2 | 9.9 | 10.2 |
| d4s | 5.71 | 5.71 | 5.71 |
| D4m | 8.4 | 8.4 | 8.4 |
| dAs | 11.17 | 11.17 | 11.17 |
| dBs | 6.13 | 6.13 | 6.13 |
| EPB4 | 1.2 | 1.2 | 1.2 |
| EP24 | 3.49 | 3.21 | 3.49 |
| LA | 9.69 | 9.69 | 9.69 |
| LB | 6.3 | 6.3 | 6.3 |
| CP1 | 0.03 | 0.03 | 0.03 |

TABLE 7-continued

| Parameter/state | 3-1 | 3-2 | 3-3 |
|---|---|---|---|
| CP1b | 1.16 | 1.36 | 1.36 |
| CP2 | 0.03 | 0.03 | 0.03 |
| CP4 | 0.03 | 0.03 | 0.03 |

In Embodiment III, the object-side surface S1 of the first lens is a convex surface, and the image-side surface S2 of the first lens is a concave surface. The object-side surface S3 of the second lens is a convex surface, and the image-side surface S4 of the second lens is a convex surface. The object-side surface S5 of the third lens is a concave surface, and the image-side surface S6 of the third lens is a convex surface. An object-side surface S7 of the fourth lens is a concave surface, and the image-side surface S8 of the fourth lens is a convex surface. The object-side surface S9 of the fifth lens is a convex surface, and the image-side surface S10 of the fifth lens is a concave surface.

In Embodiment III, an effective focal length f1 of the first lens is −30.69 mm, an effective focal length f2 of the second lens is 7.65 mm, an effective focal length f3 of the third lens is 54.85 mm, an effective focal length f4 of the fourth lens is −10.34 mm, an effective focal length f5 of the fifth lens is 88.47 mm, an effective focal length F1 of the first lens group is 9.34 mm, an effective focal length F2 of the second lens group is −9.33 mm, an effective focal length f of the optical imaging lens assembly is 14.22 mm, a maximum semi-Field Of View (Semi-FOV) of the optical imaging lens assembly is 16.500, and an Entrance Pupil Diameter (EPD) of the optical imaging lens assembly is 7.63 mm.

Table 8 shows a basic structure parameter table of the optical imaging lens assembly in Embodiment III; and curvature radius, and thickness/distance are all in millimeters (mm).

TABLE 8

| | | | | Material | | Effec- |
|---|---|---|---|---|---|---|
| Surface number | Surface type | Curvature radius | Thick-ness | Refractive index | Abbe number | tive radius |
| OBJ | Spherical surface | Infinite | Infinite | | | |
| STO | Spherical surface | Infinite | −0.3204 | | | 3.8139 |
| S1 | Aspheric surface | 13.3854 | 1.5187 | 1.67 | 19.24 | 3.8139 |
| S2 | Aspheric surface | 7.7678 | 0.5732 | | | 3.7527 |
| S3 | Aspheric surface | 5.2823 | 5.0000 | 1.54 | 56.11 | 4.0525 |
| S4 | Aspheric surface | −13.3131 | 0.8016 | | | 3.4491 |
| S5 | Aspheric surface | −10.5678 | 0.8889 | 1.615 | 25.92 | 3.0172 |
| S6 | Aspheric surface | −8.3194 | 0.7000 | | | 2.9737 |
| S7 | Aspheric surface | −5.4881 | 0.4000 | 1.56 | 37.32 | 3.0908 |
| S8 | Aspheric surface | −81.9746 | 0.4953 | | | 3.0015 |
| S9 | Aspheric surface | 6.1594 | 3.5758 | 1.56 | 37.32 | 2.9987 |
| S10 | Aspheric surface | 5.5379 | 3.1016 | | | 3.8162 |
| S11 | Spherical surface | Infinite | 0.2100 | 1.52 | 64.2 | 4.1414 |
| S12 | Spherical surface | Infinite | 1.0000 | | | 4.1842 |
| S13 | Spherical surface | Infinite | 0.0000 | | | 4.5046 |

Table 9 shows polynomial coefficients applied to each of the aspheric surfaces in Embodiment III; and each of the aspheric surface types may be limited by the equation (1) provided in Embodiment 1.

TABLE 9

| Surface number | A4 | A6 | A8 | A10 | A12 | A14 | A16 |
|---|---|---|---|---|---|---|---|
| S1 | −3.2052E−04 | 4.4064E−05 | −4.9313E−05 | 3.5062E−05 | −1.2985E−05 | 3.0095E−06 | −4.6367E−07 |
| S2 | −1.8797E−04 | −2.5126E−05 | 6.8255E−05 | −1.7785E−05 | 2.7210E−06 | −2.7592E−07 | 1.7595E−08 |
| S3 | 2.9356E−02 | −6.5101E−03 | 2.5510E−03 | −9.9756E−04 | 2.8211E−04 | −5.6567E−05 | 8.0843E−06 |
| S4 | 1.6349E−02 | 8.7464E−04 | −3.7075E−04 | −9.6303E−06 | 1.5736E−05 | −3.0835E−06 | 3.2479E−07 |
| S5 | −1.2967E−02 | 6.4527E−03 | −2.4983E−03 | 7.6007E−04 | −1.7930E−04 | 3.1538E−05 | −4.0001E−06 |
| S6 | −1.0273E−03 | 6.1326E−04 | −8.6624E−04 | 6.9113E−04 | −3.3641E−04 | 1.0928E−04 | −2.4793E−05 |
| S7 | 5.1436E−03 | −8.5428E−04 | 1.9749E−04 | 2.0978E−05 | −4.0141E−05 | 1.6296E−05 | −3.7716E−06 |
| S8 | 4.7258E−03 | −1.1499E−03 | 5.7333E−04 | −2.5151E−04 | 7.6767E−05 | −1.6546E−05 | 2.4748E−06 |
| S9 | −2.0533E−02 | 4.8568E−03 | −3.2364E−03 | 1.9414E−03 | −7.1764E−04 | 1.1584E−04 | 2.0609E−05 |
| S10 | −1.9546E−02 | 5.2819E−03 | −2.6830E−03 | 1.2685E−03 | −4.0606E−04 | 7.6180E−05 | −4.8268E−06 |

| Surface number | A18 | A20 | A22 | A24 | A26 | A28 | A30 |
|---|---|---|---|---|---|---|---|
| S1 | 4.8244E−08 | −3.3533E−09 | 1.4925E−10 | −3.8476E−12 | 4.3702E−14 | 0.0000E+00 | 0.0000E+00 |
| S2 | −6.3725E−10 | 9.9932E−12 | 0.0000E+00 | 0.0000E+00 | 0.0000E+00 | 0.0000E+00 | 0.0000E+00 |
| S3 | −8.1936E−07 | 5.7613E−08 | −2.6764E−09 | 7.3980E−11 | −9.2289E−13 | 0.0000E+00 | 0.0000E+00 |
| S4 | −2.0309E−08 | 7.1038E−10 | −1.0728E−11 | 0.0000E+00 | 0.0000E+00 | 0.0000E+00 | 0.0000E+00 |
| S5 | 3.5254E−07 | −2.0278E−08 | 6.5302E−10 | −4.8332E−12 | −3.5582E−13 | 8.4763E−15 | 0.0000E+00 |
| S6 | 4.0153E−06 | −4.6717E−07 | 3.8750E−08 | −2.2359E−09 | 8.5267E−11 | −1.9316E−12 | 1.9679E−14 |
| S7 | 5.6089E−07 | −5.4576E−08 | 3.3660E−09 | −1.1957E−10 | 1.8652E−12 | 0.0000E+00 | 0.0000E+00 |
| S8 | −2.4967E−07 | 1.6145E−08 | −6.0306E−10 | 9.8858E−12 | 0.0000E+00 | 0.0000E+00 | 0.0000E+00 |
| S9 | −1.6410E−05 | 4.4403E−06 | −7.0792E−07 | 7.1852E−08 | −4.5789E−09 | 1.6765E−10 | −2.6970E−12 |
| S10 | −1.3575E−06 | 4.2954E−07 | −6.0458E−08 | 5.0701E−09 | −2.5976E−10 | 7.5336E−12 | −9.5065E−14 |

Figure 20:
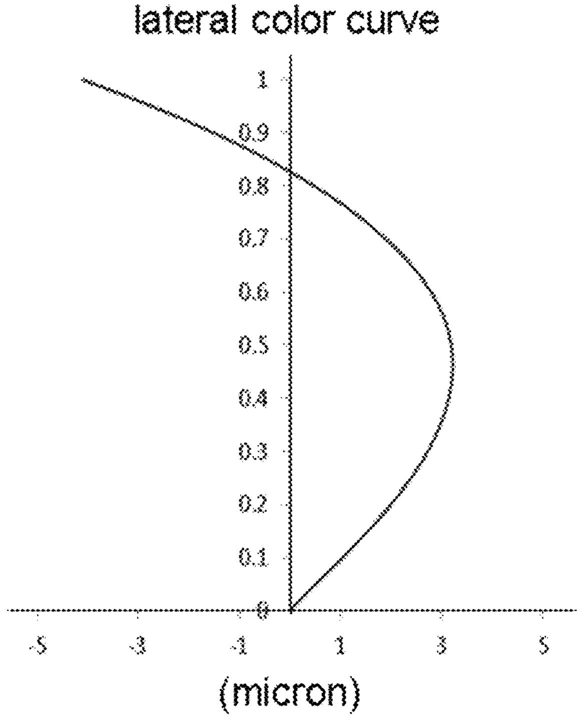
FIG. 20 to FIG. 23 respectively show a lateral color curve, a longitudinal aberration curve, an astigmatism curve, and a distortion curve of an optical imaging lens assembly according to Embodiment III of the disclosure.
Figure 21:
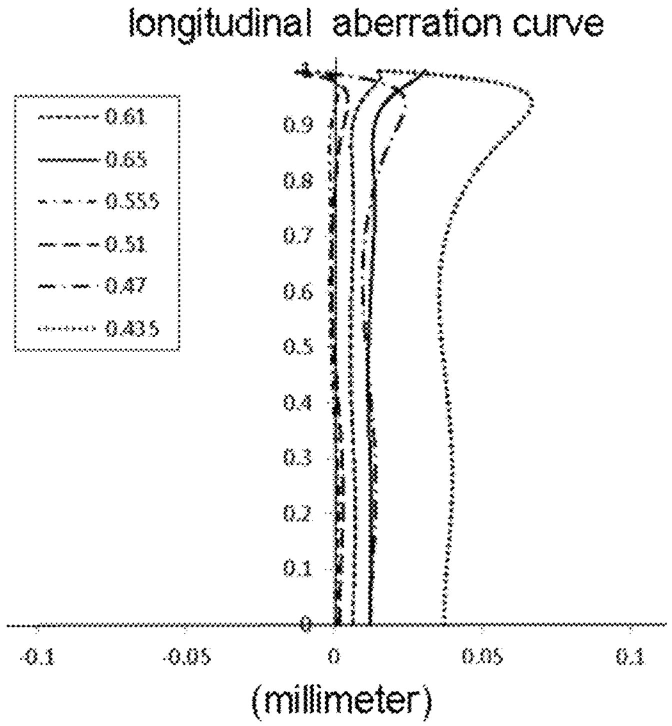
Figure 22:
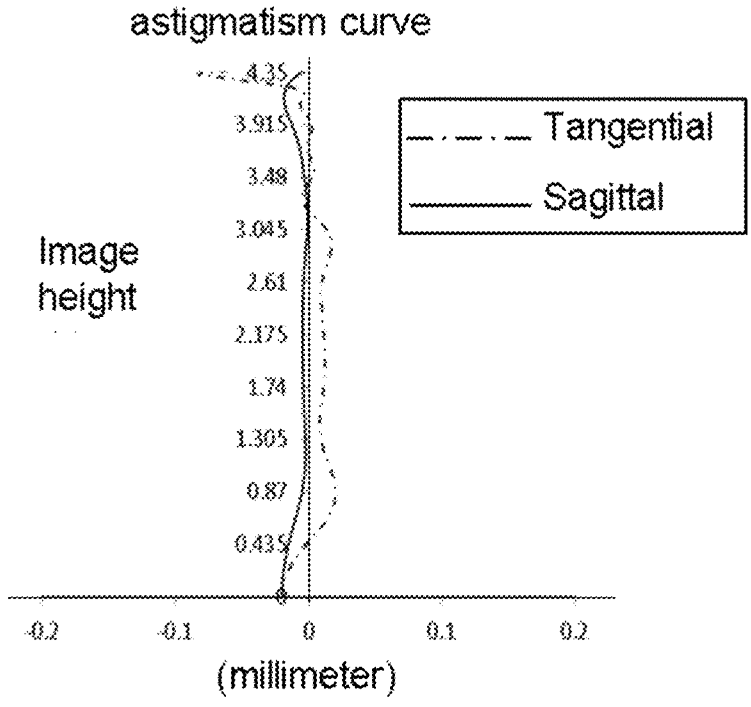
Figure 23:
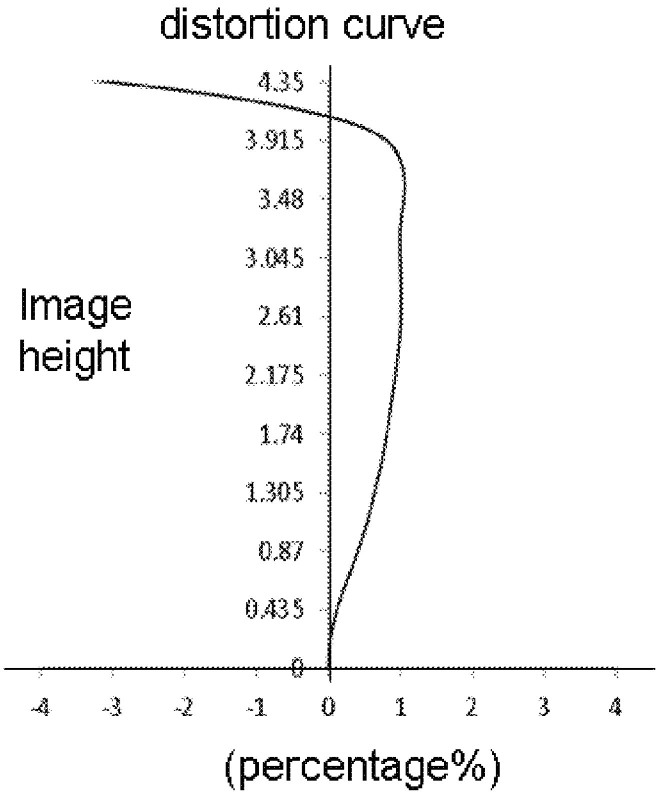

FIG. 20 shows a lateral color curve of the optical imaging lens assembly in Embodiment III; and the lateral color curve represents deviation of different image heights on the imaging surface after the light passes through the optical camera lens. FIG. 21 shows a longitudinal aberration curve of the optical imaging lens assembly in Embodiment III; and the longitudinal aberration curve represents deviation of a convergence focal point after light with different wavelengths passes through the optical imaging lens assembly. FIG. 22 shows an astigmatism curve of the optical imaging lens assembly in Embodiment III; and the astigmatism curve represents a tangential image surface curvature and a sagittal image surface curvature. FIG. 23 shows a distortion curve of the optical imaging lens assembly in Embodiment III; and the distortion curve represents distortion values corresponding to different FOVs.

According to FIG. 20 to FIG. 23, it may be learned that, the optical imaging lens assembly provided in Embodiment III may achieve desirable imaging quality.

To sum up, Embodiment I to Embodiment III respectively meet relationships shown in Table 10.

TABLE 10

| Conditional | embodiment | | | | | | | | |
|---|---|---|---|---|---|---|---|---|---|
| expression | 1-1 | 1-2 | 1-3 | 2-1 | 2-2 | 2-3 | 3-1 | 3-2 | 3-3 |
| d4s/F2 | −0.72 | −0.73 | −0.73 | −0.51 | −0.51 | −0.51 | −0.61 | −0.61 | −0.61 |
| EPB4/LB − R7/R8 | 0.37 | 0.37 | 0.37 | 0.13 | 0.14 | 0.11 | 0.12 | 0.12 | 0.12 |
| f5/V5/D4m | −0.02 | −0.02 | −0.02 | 0.10 | 0.10 | 0.10 | 0.28 | 0.28 | 0.28 |
| (LA − LB)/(F1 − F2) | 0.27 | 0.23 | 0.27 | −0.12 | −0.14 | −0.12 | 0.18 | 0.18 | 0.18 |
| d1m/f1 − d1m/f2 | 1.26 | 1.26 | 1.24 | 0.66 | 0.66 | 0.67 | −1.25 | −1.23 | −1.24 |
| (D2m − d2m)/(R4 + R5) | −2.50 | −3.52 | −2.59 | 0.10 | 0.09 | 0.09 | −0.14 | −0.15 | −0.14 |
| f4/EPB4/N4 | −16.03 | −16.03 | −16.03 | −2.03 | −1.96 | −2.12 | −5.52 | −5.52 | −5.52 |
| D1bm/R3 + D1bs/R2 | −2.31 | −2.30 | −2.20 | 2.18 | 2.17 | 2.13 | 3.17 | 3.05 | 3.16 |
| (CP1b + CP2b + CP4b)/(T12 + T23 + T45) | 0.51 | 0.43 | 0.41 | 1.04 | 0.89 | 1.11 | 0.62 | 0.73 | 0.73 |
| f/ΣCP | 4.92 | 5.85 | 6.10 | 5.19 | 6.00 | 4.87 | 11.38 | 9.81 | 9.81 |
| dAs/F1 − dBs/F2 | 1.99 | 1.99 | 1.99 | 1.52 | 1.51 | 1.52 | 1.85 | 1.85 | 1.85 |
| f3/(EP24 − EPB4) | 1.29 | 1.35 | 1.32 | 3.76 | 3.76 | 3.76 | 23.95 | 27.29 | 23.95 |

It is to be noted that, 1-1 in Table 10 represents that the optical imaging lens assembly in Embodiment I is in the first state; 1-2 represents that the optical imaging lens assembly in Embodiment I is in the second state; 1-3 represents that the optical imaging lens assembly in Embodiment I is in the third state; 2-1 represents that the optical imaging lens assembly in Embodiment II is in the first state; 2-2 represents that the optical imaging lens assembly in Embodiment II is in the second state; 2-3 represents that the optical imaging lens assembly in Embodiment II is in the third state; 3-1 represents that the optical imaging lens assembly in Embodiment III is in the first state; 3-2 represents that the optical imaging lens assembly in Embodiment III is in the second state; and 3-3 represents that the optical imaging lens assembly in Embodiment III is in the third state.

Further provided in the disclosure is an imaging apparatus. An electronic photosensitive element of the imaging apparatus may be a Charge-Coupled Device (CCD) or a Complementary Metal Oxide Semiconductor (CMOS). The imaging apparatus may be an independent imaging device such as a digital camera, and may also be an imaging module which is integrated on a mobile electronic device such as a mobile phone. The imaging apparatus is provided with the optical imaging lens assembly described above.

It is apparent that the described embodiments are only part of the embodiments of the disclosure, not all the embodiments. Based on the embodiments in the disclosure, all other embodiments obtained by those of ordinary skill in the art without creative work shall fall within the protection scope of the disclosure.

It is to be noted that, terms used herein are intended to describe specific implementations only and are not intended to limit exemplary embodiments according to the disclosure. As used herein, unless the context clearly indicates otherwise, a singular form is also intended to include a plural form. In addition, it is further understood that when the terms "including" and/or "comprising" are used in this specification, the terms indicate the presence of features, steps, operations, devices, components, and/or a combination thereof.

It is to be noted that terms "first", "second" and the like in the description, claims and the above mentioned drawings of the disclosure are used for distinguishing similar objects rather than describing a specified sequence or a precedence order. It should be understood that the data used in such a way may be exchanged where appropriate, in order that the implementations of the disclosure described here can be implemented in an order other than those illustrated or described herein.

The above are only the preferred embodiments of the disclosure and are not intended to limit the disclosure. For those skilled in the art, the disclosure may have various modifications and variations. Any modifications, equivalent replacements, improvements and the like made within the spirit and principle of the disclosure all fall within the scope of protection of the disclosure.

The invention claimed is:

1. An optical imaging lens assembly, comprising a first lens barrel, a second lens barrel, a first lens group, a second lens group, and a plurality of spacers;

the first lens group is disposed in the first lens barrel, and the first lens group comprises a first lens, a second lens, and a third lens having a positive refractive power in sequence from an object side to an image side;

the second lens group is disposed in the second lens barrel, the second lens group comprises a fourth lens having a negative refractive power and a fifth lens in sequence from an object side to an image side, an object-side surface of the fourth lens is a concave surface, and an image-side surface of the fourth lens is a convex surface;

the plurality of spacers at least comprise a first spacer, a second spacer, and a fourth spacer, wherein an internal diameter of the fourth spacer is minimum, the first spacer is located on an image side of the first lens and partially abuts against an image-side surface of the first lens, the second spacer is located on an image side of the second lens and partially abuts against an image-side surface of the second lens, and the fourth spacer is located on an image side of the fourth lens and partially abuts against an image-side surface of the fourth lens; and when an internal diameter d4s of an object side of the fourth spacer and an effective focal length F2 of the second lens group meet $-0.8<d4s/F2<0$, an on-axis distance EPB4 between an object-side end surface of the second lens barrel and an object-side surface of the fourth spacer, a maximum axial height LB of the second lens barrel, a curvature radius R7 of the object-side surface of the fourth lens, and a curvature radius R8 of the image-side surface of the fourth lens meet $0.1<EPB4/LB-R7/R8<0.5$.

2. The optical imaging lens assembly as claimed in claim 1, wherein an effective focal length f5 of the fifth lens, an abbe number V5 of the fifth lens, and an external diameter D4m of an image side of the fourth spacer meet $-0.1<f5/V5/D4m<0.3$.

3. The optical imaging lens assembly as claimed in claim 1, wherein a maximum axial height LA of the first lens barrel, the maximum axial height LB of the second lens barrel, an effective focal length F1 of the first lens group, and the effective focal length F2 of the second lens group meet $-0.2<(LA-LB)/(F1-F2)<0.3$.

4. The optical imaging lens assembly as claimed in claim 1, wherein an internal diameter d1m of an image-side surface of the first spacer, an effective focal length f1 of the first lens, and an effective focal length f2 of the second lens meet $-2<d1m/f1-d1m/f2<2$.

5. The optical imaging lens assembly as claimed in claim 1, wherein an internal diameter d2m of an image-side surface of the second spacer, an external diameter D2m of the image-side surface of the second spacer, a curvature radius R4 of the image-side surface of the second lens, and a curvature radius R5 of an object-side surface of the third lens meet $-4<(D2m-d2m)/(R4+R5)<0.5$.

6. The optical imaging lens assembly as claimed in claim 1, wherein an effective focal length f4 of the fourth lens, the on-axis distance EPB4 between the object-side end surface of the second lens barrel and the object-side surface of the fourth spacer, and a refractive index N4 of the fourth lens meet $-20<f4/EPB4/N4<0$.

7. The optical imaging lens assembly as claimed in claim 1, wherein the plurality of spacers further comprise a first auxiliary spacer, the first auxiliary spacer is located between the first spacer and the second lens, and an object-side surface of the first auxiliary spacer partially abuts against the first spacer; and an internal diameter D1bm of an image-side surface of the first auxiliary spacer, an internal diameter D1bs of the object-side surface of the first auxiliary spacer, a curvature radius R3 of an object-side surface of the second lens, and a curvature radius R2 of the image-side surface of the first lens meet $-3<D1bm/R3+D1bs/R2<5$.

8. The optical imaging lens assembly as claimed in claim 1, wherein the plurality of spacers further comprise a first auxiliary spacer, a second auxiliary spacer, and a fourth auxiliary spacer, the first auxiliary spacer is located between the first spacer and the second lens, an object-side surface of the first auxiliary spacer partially abuts against the first spacer, the second auxiliary spacer is located between the second spacer and the third lens, an object-side surface of the second auxiliary spacer partially abuts against the second spacer, the fourth auxiliary spacer is located between the fourth spacer and the fifth lens, and an object-side surface of the fourth auxiliary spacer partially abuts against the fourth spacer; and a thickness CP1b of the first auxiliary spacer, a thickness CP2b of the second auxiliary spacer, a thickness CP4b of the fourth auxiliary spacer, an air gap T12 between the first lens and the second lens, an air gap T23 between the second lens and the third lens, and an air gap T45 between the fourth lens and the fifth lens meet $0.3<(CP1b+CP2b+CP4b)/(T12+T23+T45)<2$.

9. The optical imaging lens assembly as claimed in claim 1, wherein the plurality of spacers further comprise a first auxiliary spacer, a second auxiliary spacer, and a fourth auxiliary spacer, the first auxiliary spacer is located between the first spacer and the second lens, an object-side surface of the first auxiliary spacer partially abuts against the first spacer, the second auxiliary spacer is located between the second spacer and the third lens, an object-side surface of the second auxiliary spacer partially abuts against the second spacer, the fourth auxiliary spacer is located between the fourth spacer and the fifth lens, and an object-side surface of the fourth auxiliary spacer partially abuts against the fourth spacer;

a thickness CP1 of the first spacer and a thickness CP1b of the first auxiliary spacer meet $CP1b>CP1$;

a thickness CP2 of the second spacer and a thickness CP2b of the second auxiliary spacer meet $CP2b>CP2$; and a thickness CP4 of the fourth spacer and a thickness CP4b of the fourth auxiliary spacer meet $CP4b>CP4$.

10. The optical imaging lens assembly as claimed in claim 1, wherein a sum ΣCP of thicknesses of the plurality of spacers and an effective focal length f of the optical imaging lens assembly meet $4<f/\Sigma CP<12$.

11. The optical imaging lens assembly as claimed in claim 1, wherein an internal diameter dAs of an object side of the first lens barrel, an internal diameter dBs of an object side of the second lens barrel, an effective focal length F1 of the first lens group, and an effective focal length F2 of the second lens group meet $1.5<dAs/F1-dBs/F2<2$.

12. The optical imaging lens assembly as claimed in claim 1, wherein an effective focal length f3 of the third lens, an on-axis distance EP24 between the image-side surface of the second spacer and the object-side surface of the fourth spacer, and the on-axis distance EPB4 between the object-side end surface of the second lens barrel and the object-side surface of the fourth spacer meet $4<f3/(EP24-EPB4)<30$.

13. The optical imaging lens assembly as claimed in claim 1, wherein an image-side surface of the fifth lens is bonded to an inner wall surface of the second lens barrel.

14. The optical imaging lens assembly as claimed in claim 1, wherein an air gap between the third lens and the fourth lens is able to be adjusted.

* * * * *